United States Patent
Sawada

(10) Patent No.: US 11,196,889 B2
(45) Date of Patent: Dec. 7, 2021

(54) READING APPARATUS

(71) Applicant: FUJIFILM Business Innovation Corp., Tokyo (JP)

(72) Inventor: Hiroshi Sawada, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/148,577

(22) Filed: Jan. 14, 2021

(65) Prior Publication Data

US 2021/0289097 A1    Sep. 16, 2021

(30) Foreign Application Priority Data

Mar. 12, 2020    (JP) .............................. JP2020-043482

(51) Int. Cl.
| H04N 1/04 | (2006.01) |
|---|---|
| H04N 1/028 | (2006.01) |
| G02B 3/00 | (2006.01) |
| F21V 8/00 | (2006.01) |

(52) U.S. Cl.
CPC ....... H04N 1/02895 (2013.01); G02B 3/0037 (2013.01); G02B 6/001 (2013.01)

(58) Field of Classification Search
CPC .......... H04N 1/02895; H04N 1/00997; H04N 1/0282; G02B 3/0037; G02B 6/001; G02B 3/0056; G02B 3/0062; G02B 5/003; G02B 5/005
USPC .......................... 358/475, 482, 483, 512–514
See application file for complete search history.

(56) References Cited

U.S. PATENT DOCUMENTS

| 11,044,378 B2* | 6/2021 | Asano ................ G02B 27/0006 |
|---|---|---|
| 11,073,640 B2* | 7/2021 | Asano ................... G02B 3/0062 |
| 11,079,516 B2* | 8/2021 | Hachisuga .......... H04N 1/02895 |
| 2008/0030570 A1* | 2/2008 | Nomura ..................... B41J 2/45 347/238 |
| 2010/0201778 A1* | 8/2010 | Nomura ..................... B41J 2/45 347/241 |
| 2012/0200899 A1* | 8/2012 | Ogi ...................... H04N 1/0306 358/475 |
| 2012/0300309 A1* | 11/2012 | Yamamura ........... G02B 3/0056 359/621 |
| 2013/0038915 A1* | 2/2013 | Kusaka ................ G02B 3/0062 358/474 |
| 2014/0160573 A1* | 6/2014 | Teramura ............. G02B 3/0062 359/619 |
| 2021/0289096 A1* | 9/2021 | Maeda ............... H04N 1/00997 |

FOREIGN PATENT DOCUMENTS

JP    2012217128    11/2012

* cited by examiner

*Primary Examiner* — Cheukfan Lee
(74) *Attorney, Agent, or Firm* — JCIPRNET

(57) ABSTRACT

A reading apparatus includes: a light-shielding member having a thickness T in which plural through-holes having a diameter D through which light reflected from a document passes are formed at an interval P; an optical member that includes a surface separated from and facing the light-shielding member and including lenses formed at positions facing the through-holes, in which a light-shielding film is formed on at least the surface other than a lens surface of the lens, and a distance L from the light-shielding member in an optical axis direction of the lens satisfies $0 < L \le T(P/D-1)$; and a substrate that includes an element that receives light passing through the optical member.

12 Claims, 29 Drawing Sheets

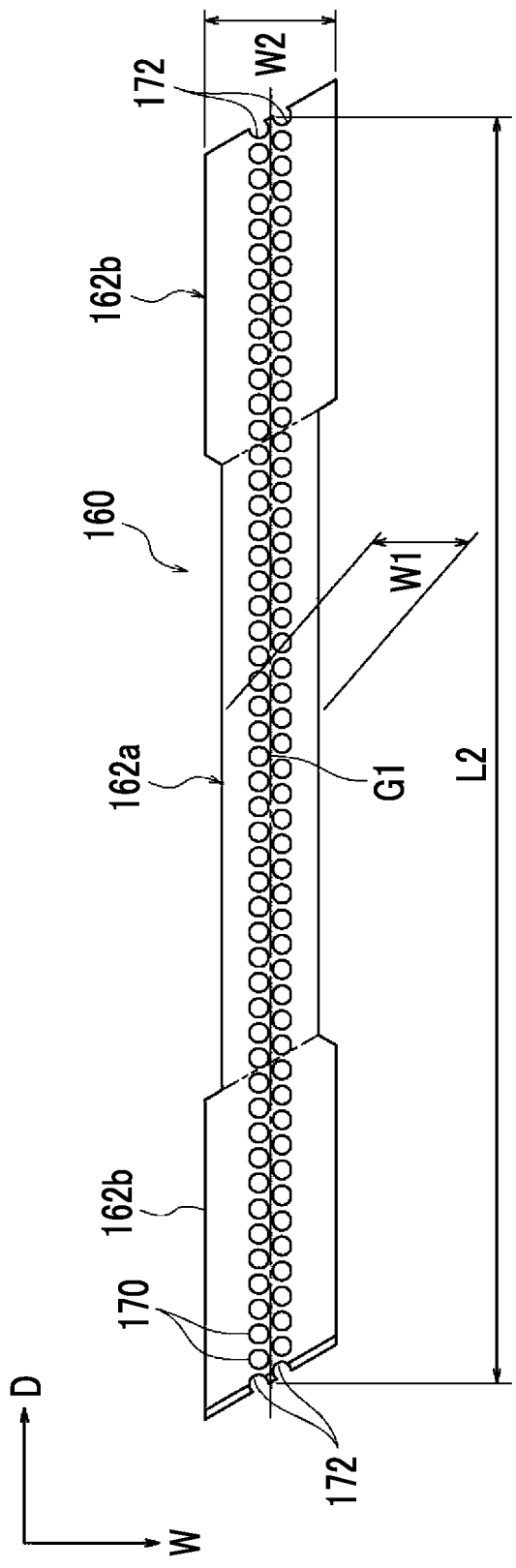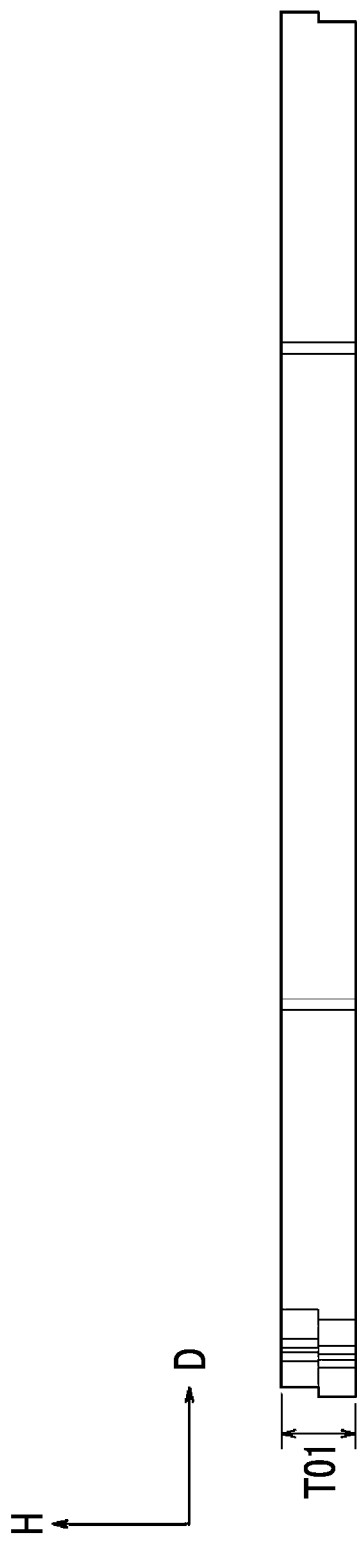

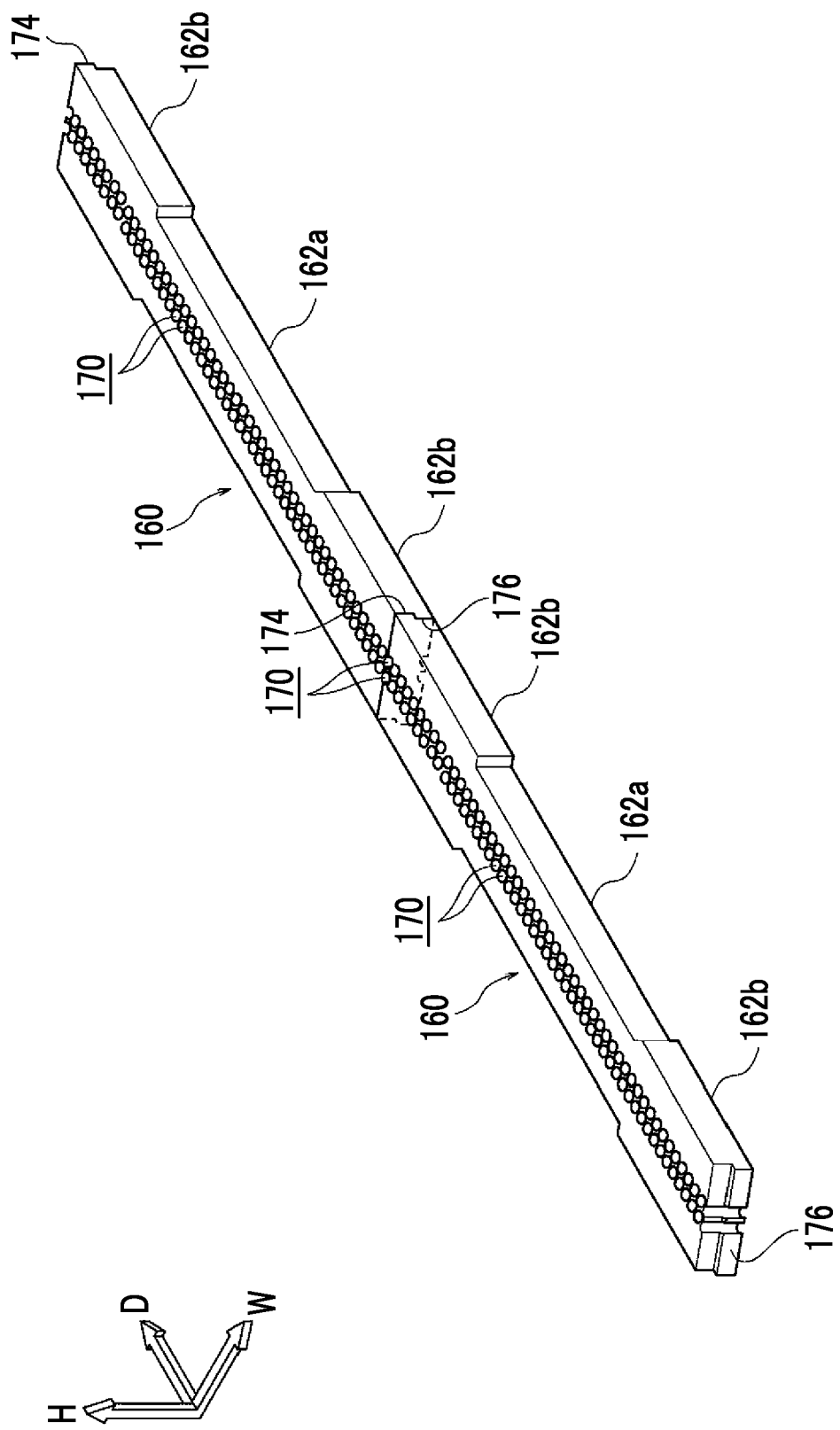

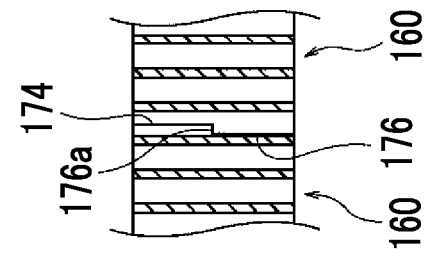
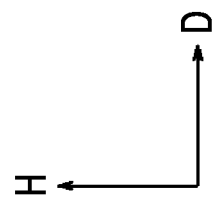
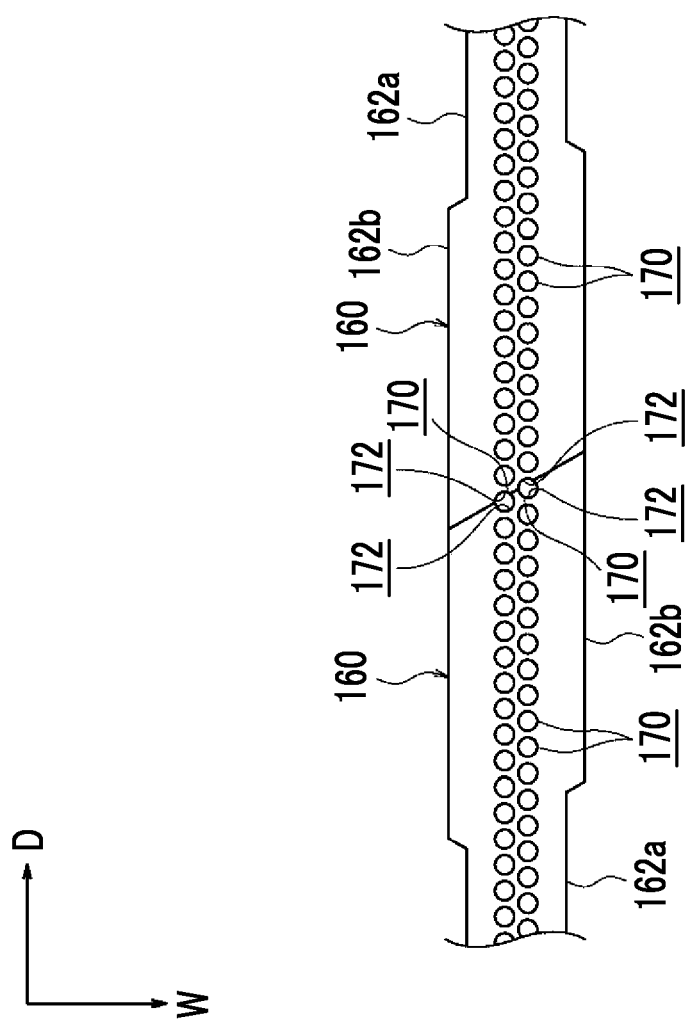

FIG. 26
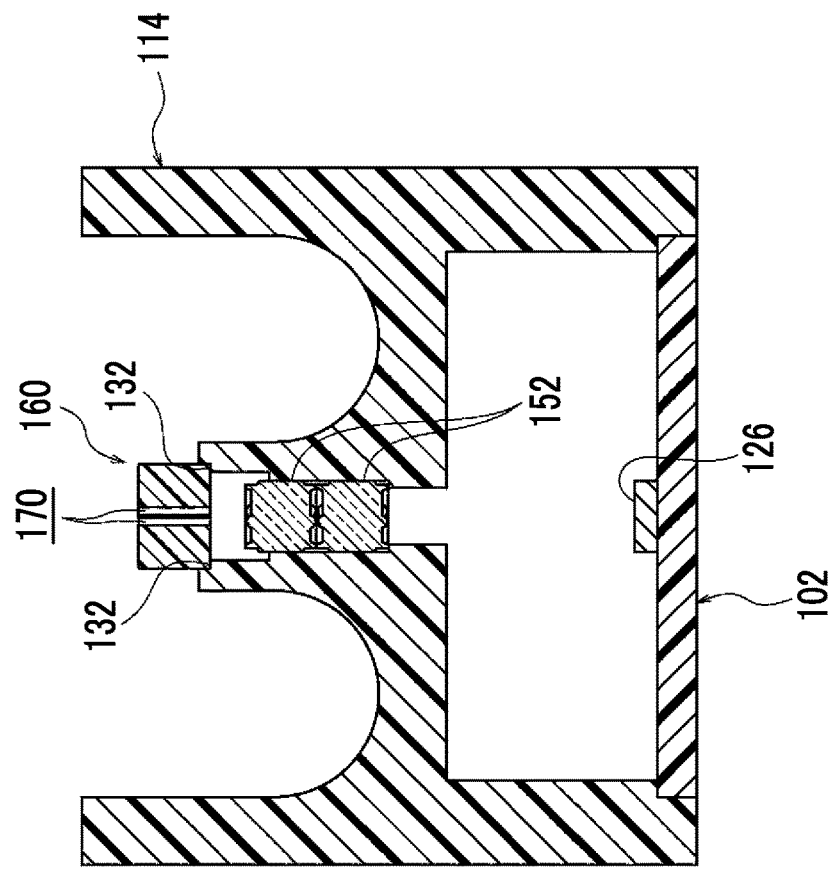
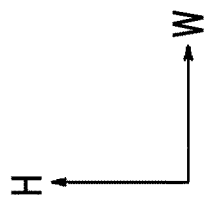

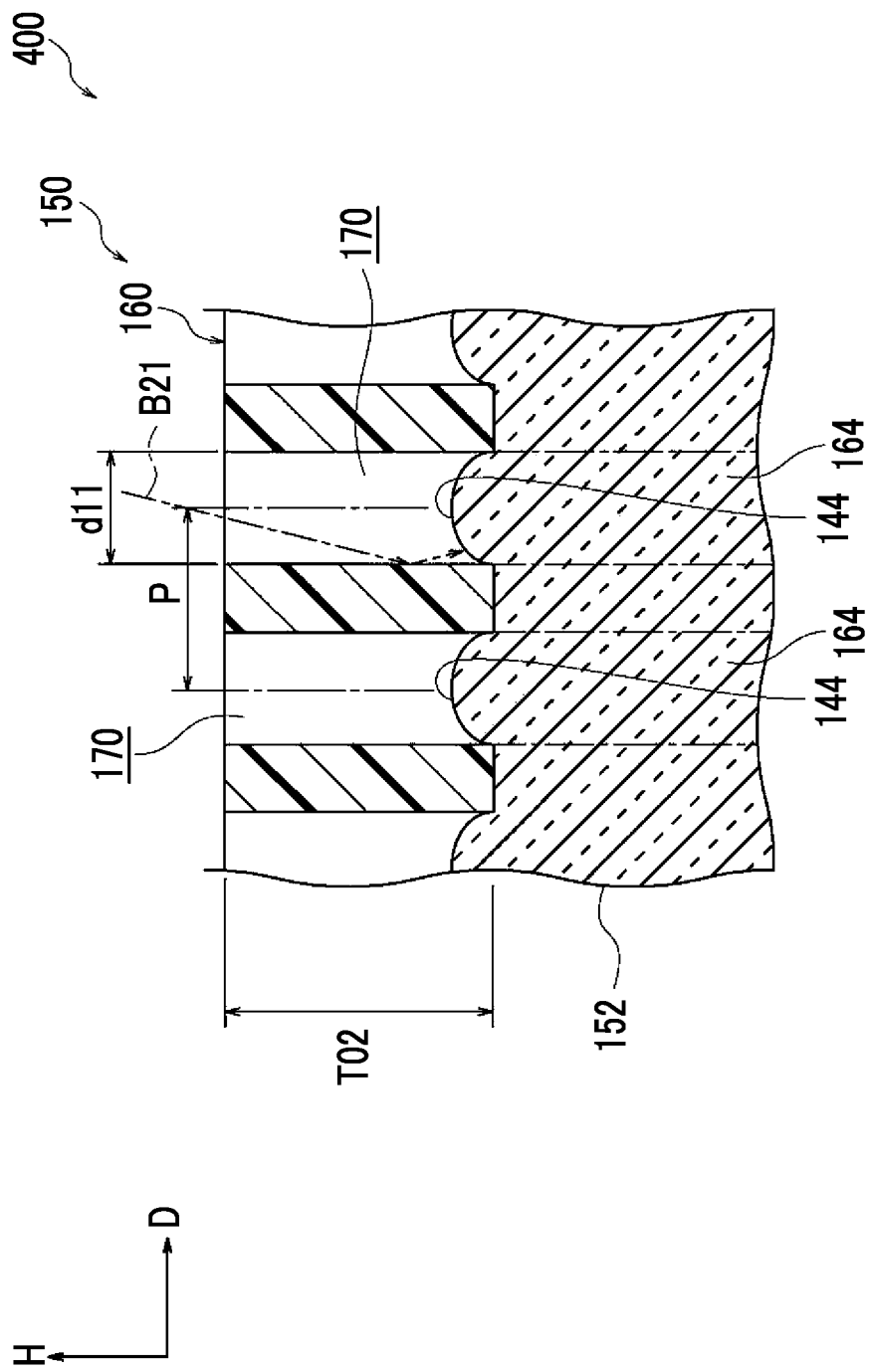

READING APPARATUS

CROSS-REFERENCE TO RELATED APPLICATIONS

This application is based on and claims priority under 35 USC 119 from Japanese Patent Application No. 2020-043482 filed Mar. 12, 2020.

BACKGROUND (i) Technical Field

The present invention relates to a reading apparatus.

(ii) Related Art

JP2012-217128A describes an image reading optical system unit including a first optical member, an aperture, and a second optical member arranged along an optical axis, in which the first optical member, the aperture, and the second optical member are formed by arranging optical elements in an array shape on a straight line orthogonal to the optical axis, and a plurality of positioning means are provided, among the plurality of positioning means, one closest to a center line or one on a center axis regulates displacement in a longitudinal direction, and the other one allows the displacement in the longitudinal direction.

SUMMARY

The reading apparatus of reading an image includes a light-shielding member in which a plurality of through-holes through which light reflected from a document on which the image is formed passes are formed, an optical member in which lenses which are respectively formed at positions facing the plurality of through-holes and through which the light passes, and a substrate which includes an element which receives the light passing through the optical member.

In such a configuration, the light passing through the through-hole formed in the light-shielding member is incident on the lens facing the through-hole. Meanwhile, in a case where the through-hole and the lens are separated from each other in an optical axis direction of the lens, the light passing through the through-hole may be incident on a portion of the optical member other than the lens around the lens.

Aspects of non-limiting embodiments of the present disclosure relate to a reading apparatus and an image forming apparatus that prevent light passing through a through-hole from being incident on a portion other than a lens around the lens in an optical member, as compared with a case where a light-shielding film is not formed on an entire surface of the optical member facing the light-shielding member and a distance between the optical member and the light-shielding member is large.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a reading apparatus including: a light-shielding member having a thickness T in which a plurality of through-holes having a diameter D through which light reflected from a document passes are formed at an interval P; an optical member that includes a surface separated from and facing the light-shielding member and including lenses formed at positions facing the through-holes, in which a light-shielding film is formed on at least the surface other than a lens surface of the lens, and a distance L from the light-shielding member in an optical axis direction of the lens satisfies $0 < L \le T(P/D - 1)$; and a substrate that includes an element that receives light passing through the optical member.

BRIEF DESCRIPTION OF THE DRAWINGS

Exemplary embodiment(s) of the present invention will be described in detail based on the following figures, wherein:

FIGS. 20A and 20B are plan views illustrating a light-shielding portion provided in the light-shielding member of the reading apparatus according to the exemplary embodiment of the invention;

FIG. 22 is a perspective view illustrating the light-shielding portion provided in the light-shielding member of the reading apparatus according to the exemplary embodiment of the invention;

FIGS. 23A and 23B are a plan view and a cross-sectional view illustrating the end portion of the light-shielding portion provided in the light-shielding member of the reading apparatus according to the exemplary embodiment of the invention;

FIG. 26 is a cross-sectional view used to explain the method of manufacturing of the reading apparatus according to the exemplary embodiment of the invention;

FIG. 29 is an enlarged cross-sectional view illustrating the lens array and the light-shielding member provided in the reading apparatus according to the comparative embodiment with respect to the exemplary embodiment of the invention.

DETAILED DESCRIPTION

Examples of a reading apparatus and an image forming apparatus according to an exemplary embodiment of the invention will be described with reference to FIGS. 1 to 29. An arrow H as illustrated indicates an apparatus upward-downward direction (a vertical direction), an arrow W indicates an apparatus width direction (a horizontal direction), and an arrow D indicates an apparatus depth direction (a horizontal direction).

Overall Configuration

Figure 1:
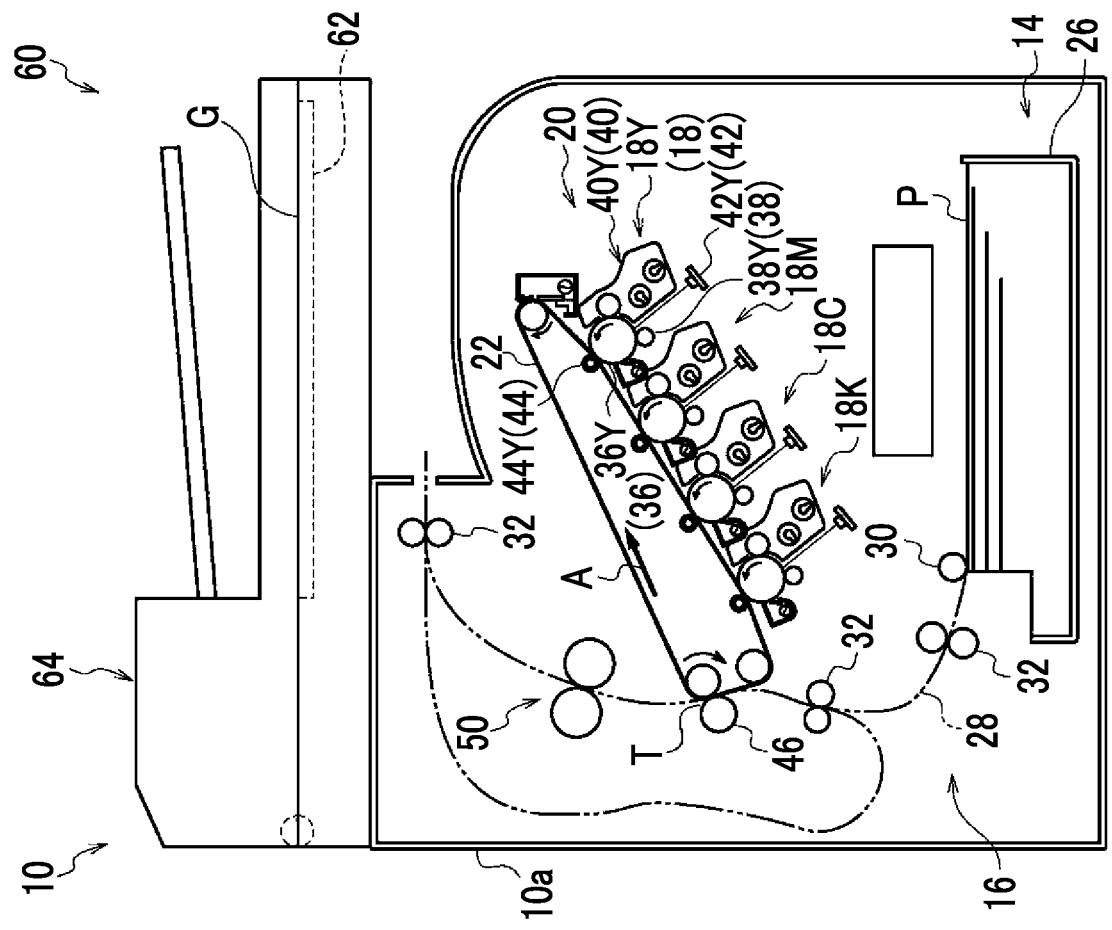
FIG. 1 is a configuration diagram illustrating an image forming apparatus according to an exemplary embodiment of the invention.

As illustrated in FIG. 1, an image forming apparatus 10 according to the present exemplary embodiment includes an accommodating portion 14 which accommodates a sheet member P as a recording medium from the lower side to the upper side in the apparatus upward-downward direction (the arrow H direction), a transport portion 16 which transports the sheet member P accommodated in the accommodating portion 14, an image forming portion 20 which forms an image on the sheet member P transported from the accommodating portion 14 by the transport portion 16, and an image reading unit 60 which reading the image formed on a document G, in this order.

Accommodating Portion 14

An accommodating member 26 capable of being pulled out from a housing 10a of the image forming apparatus 10 toward the front side in the apparatus depth direction is provided in the accommodating portion 14, and the sheet member P is loaded on the accommodating member 26. Further, a delivery roll 30 which delivers the sheet member P at a highest-level loaded on the accommodating member 26 to a transport path 28 of the sheet member P is provided in the accommodating portion 14.

Transport Portion 16

The transport portion 16 is provided with a plurality of transport rolls 32 which transport the sheet member P along the transport path 28.

Image Forming Portion 20

The image forming portion 20 is provided with four image forming units 18Y, 18M, 18C, and 18K of yellow (Y), magenta (M), cyan (C), and black (K). In the following description, in a case where it is not necessary to distinguish Y, M, C, and K, Y, M, C, and K may be omitted.

The image forming unit 18 of each color is detachable from the housing 10a. The image forming unit 18 of each color includes an image holding body 36, a charging roll 38 which charges a surface of the image holding body 36, and an exposure apparatus 42 which irradiating the charged image holding body 36 with exposure light. Further, the image forming unit 18 of each color includes a developing apparatus 40 which develops an electrostatic latent image formed by exposing the image holding body 36 charged by the exposure apparatus 42 described above and visualizes the electrostatic latent image as a toner image.

In addition, the image forming portion 20 includes an endless transfer belt 22 which circulates in the arrow A direction in FIG. 1, and a primary transfer roll 44 which transfers the toner image formed by the image forming units 18 of each color to the transfer belt 22. Further, the image forming portion 20 includes a secondary transfer roll 46 which transfers the toner image transferred to the transfer belt 22 to the sheet member P, and a fixing apparatus 50 heats and pressurizes the sheet member P onto which the toner image is transferred to fix the toner image to the sheet member P. The secondary transfer roll 46 is an example of a transfer apparatus.

Image Reading Unit 60

Figure 2:
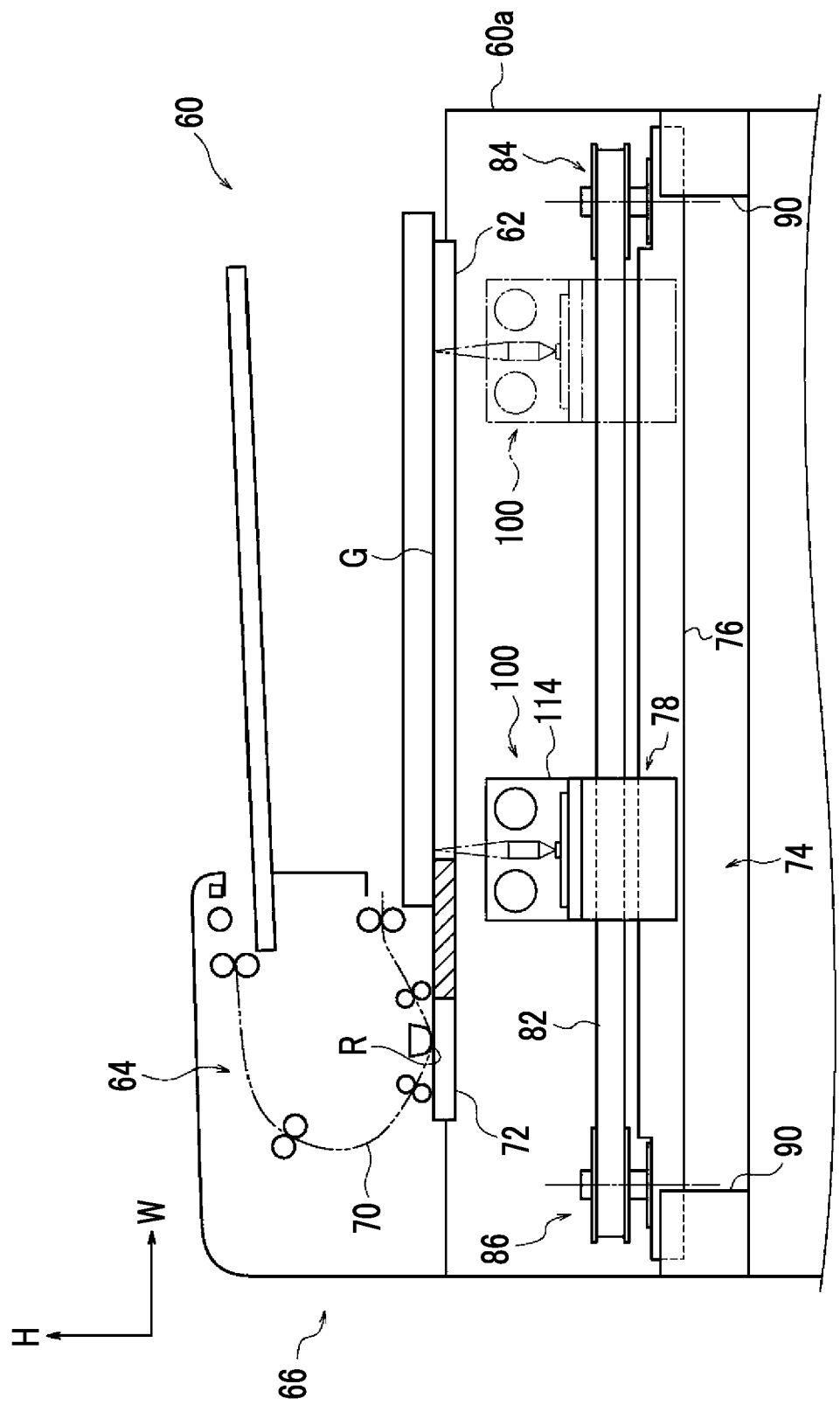
FIG. 2 is a configuration diagram illustrating an image reading unit of the image forming apparatus according to the exemplary embodiment of the invention.

As illustrated in FIG. 2, the image reading unit 60 includes a first transparent plate 62 (=platen glass) on which the document G is placed in a case where an image of one document G is read, and a second transparent plate 72 disposed on one side of the first transparent plate 62 in the apparatus width direction (left side in FIG. 2). The first transparent plate 62 and the second transparent plate 72 are fitted in an upper portion of the housing 60a in the image reading unit 60.

Above the first transparent plate 62 and the second transparent plate 72, an opening and closing cover 66 which opens and closes the first transparent plate 62 and the second transparent plate 72 is disposed. Inside the opening and closing cover 66, a transport apparatus 64 (=an ADF apparatus) which transports a plurality of documents G along the transport path 70 in the opening and closing cover 66 and passes the plurality of documents G through a document reading position R above the second transparent plate 72 is provided.

In addition, inside the housing 60a, a reading apparatus 100 which reads the image of the document G placed on the first transparent plate 62 and the image of the document G transported to the document reading position R by the transport apparatus 64 is provided. Further, the image reading unit 60 includes a drive apparatus 74 which drives the reading apparatus 100 in the apparatus width direction. Details of the reading apparatus 100 will be described below.

Figure 3:
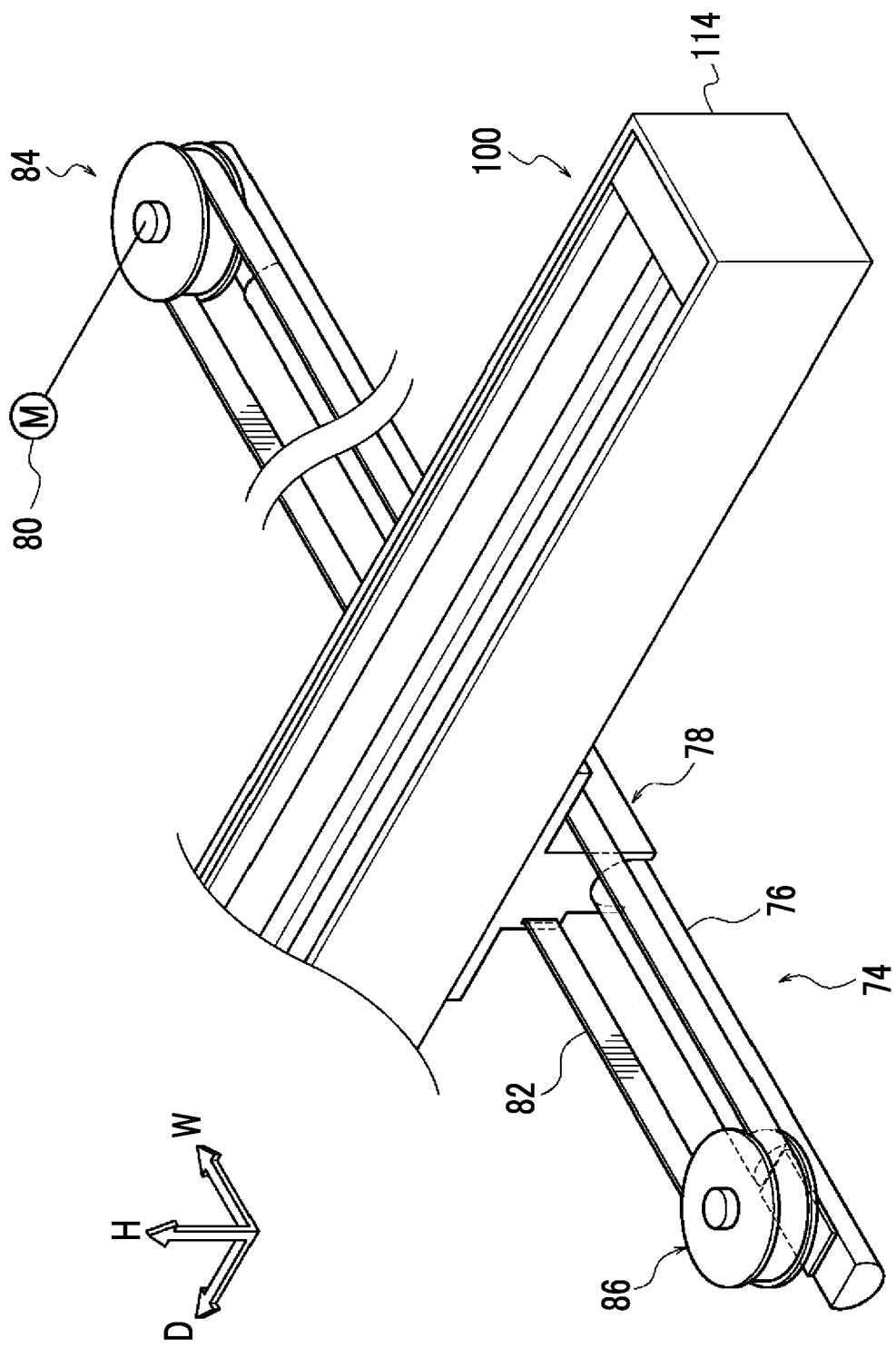
FIG. 3 is an enlarged perspective view illustrating a reading apparatus and the like of the image reading unit of the image forming apparatus according to the exemplary embodiment of the invention.

As illustrated in FIGS. 2 and 3, the drive apparatus 74 includes a shaft 76 extending in the apparatus width direction (=a moving direction of the reading apparatus 100) and a sliding member 78 which is attached to a lower surface of the housing 114 of the reading apparatus 100 and which is slidably supported to the shaft 76.

Further, the drive apparatus 74 includes a motor 80, a drive pulley 84 which is rotationally driven by transmitting a driving force from the motor 80, a driven pulley 86 which is driven and rotated, and an endless belt 82 winding around the drive pulley 84 and the driven pulley 86. The drive pulley 84 is attached to one end of the shaft 76, and the driven pulley 86 is attached to the other end of the shaft 76.

Figure 4:
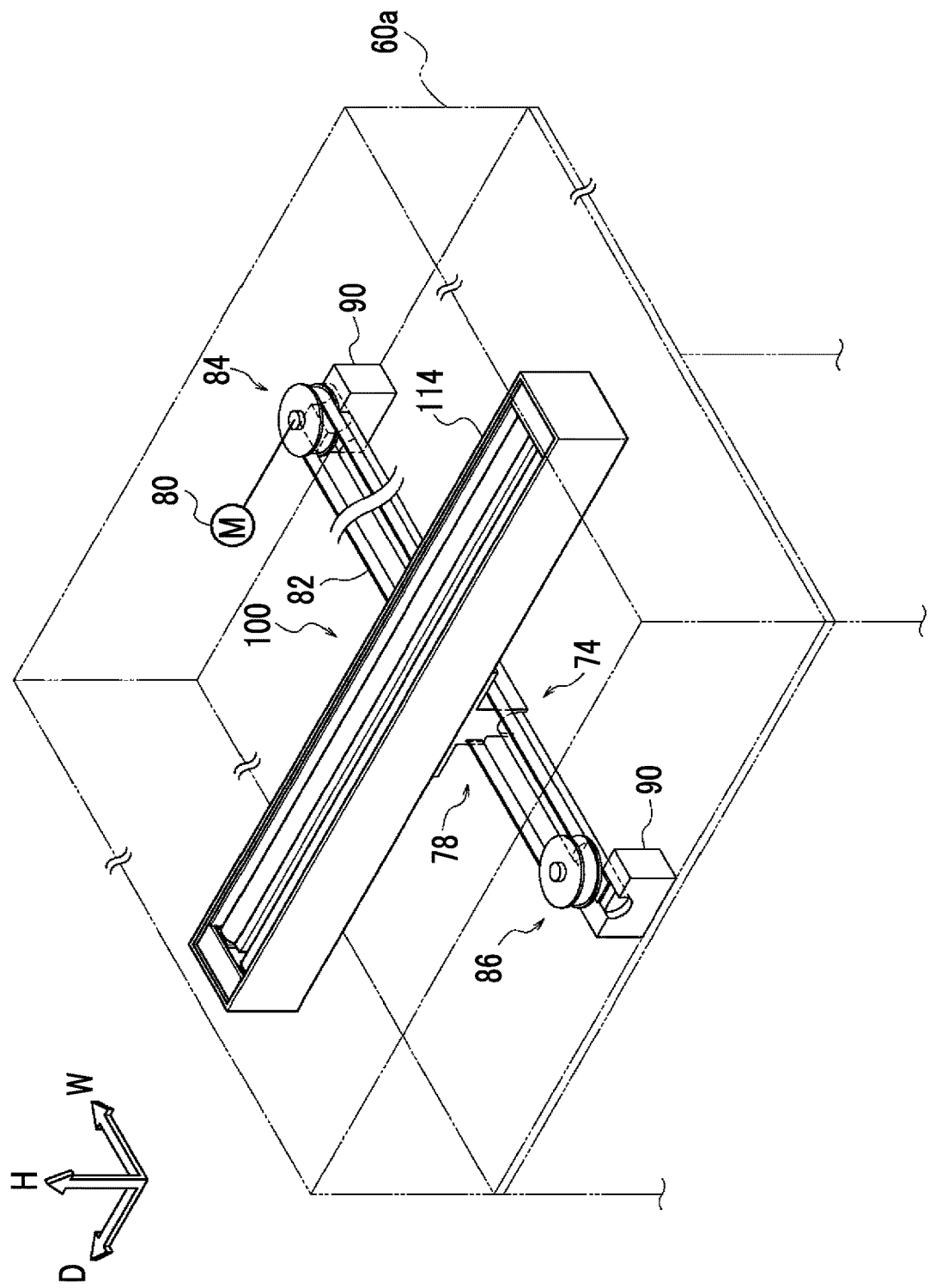
FIG. 4 is a perspective view illustrating the reading apparatus and the like of the image reading unit of the image forming apparatus according to the exemplary embodiment of the invention.
Figure 5:
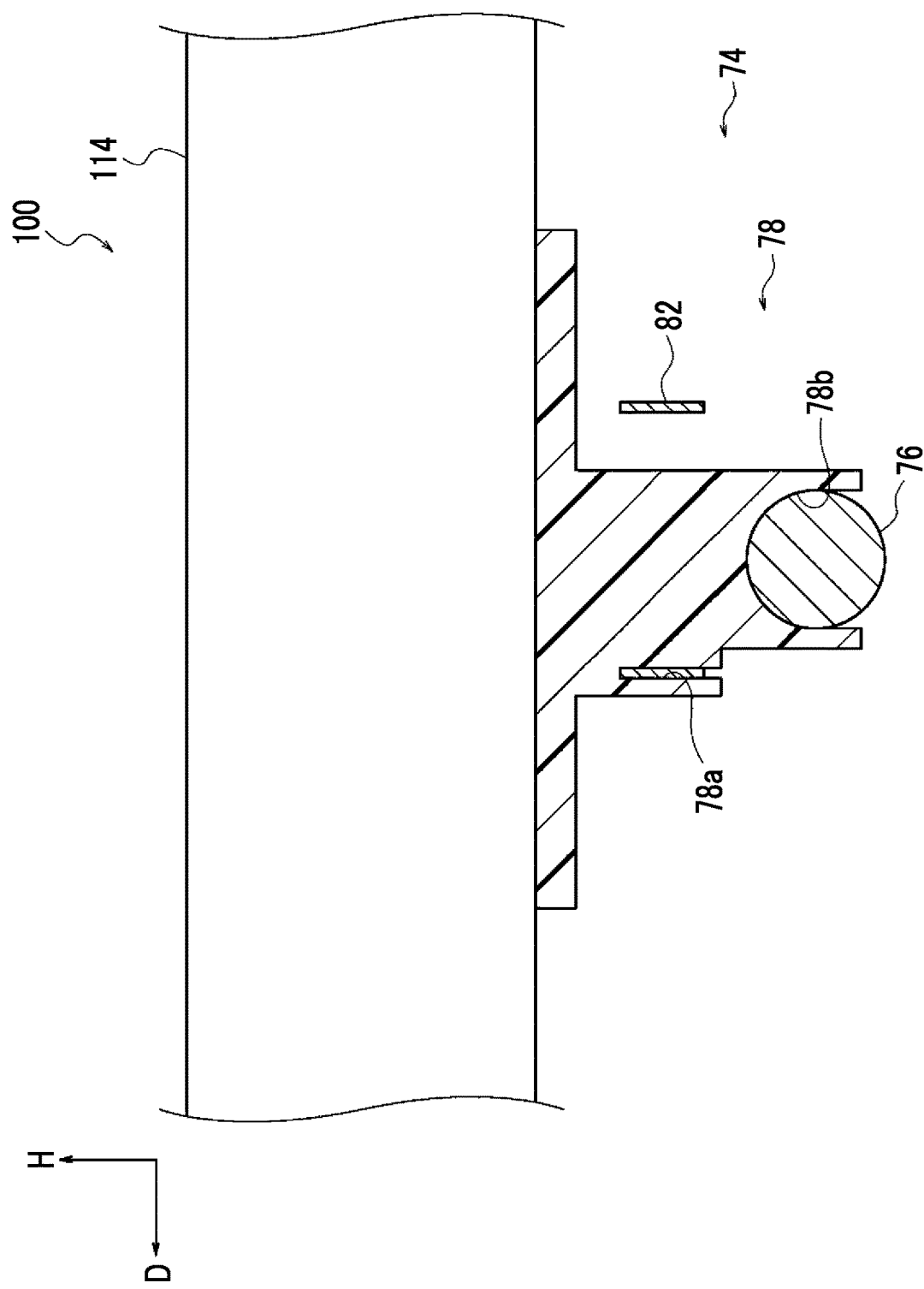
FIG. 5 is a cross-sectional view illustrating a sliding member of the reading apparatus in the image reading unit of the image forming apparatus according to the exemplary embodiment of the invention.

As illustrated in FIG. 4, the sliding member 78 is attached to a portion on a central side of the lower surface of the housing 114 in the apparatus depth direction. As illustrated in FIG. 5, in the sliding member 78, a slit 78a extending in the upward-downward direction and in which a part of the endless belt 82 is fitted, and a moving sliding surface 78b sliding with the semicircular shaft 76 as viewed from the apparatus width direction are formed.

In addition, as illustrated in FIG. 4, in the housing 60a, a pair of support portions 90 which support both end portions of the shaft 76 from below is integrally formed with the housing 60a.

Action of Entire Configuration

In the image forming apparatus 10, an image is formed as follows.

Figure 6:
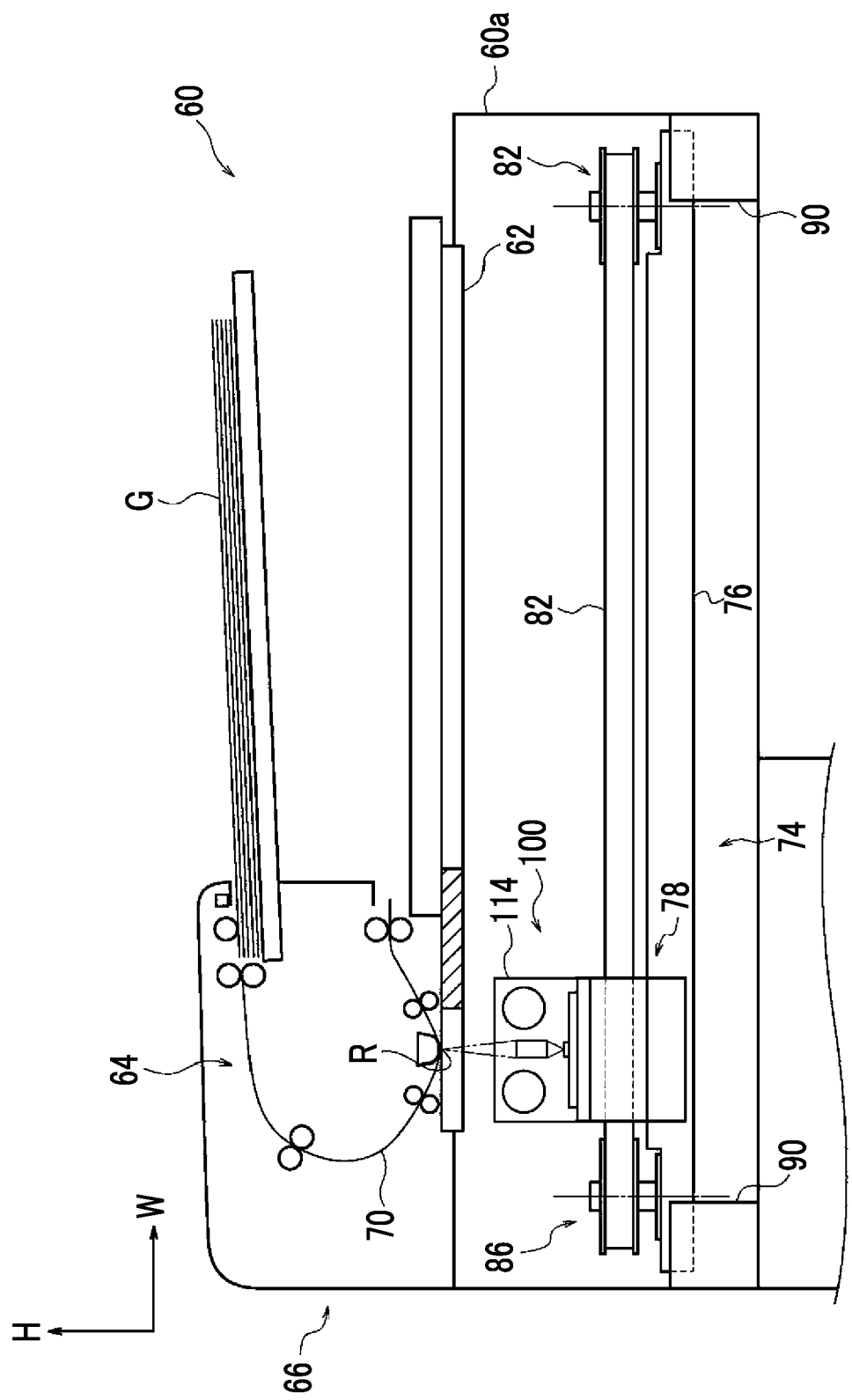
FIG. 6 is an operation diagram illustrating the image reading unit of the image forming apparatus according to the exemplary embodiment of the invention.

First, the image reading unit 60 illustrated in FIG. 6 reads an image of the document G. Specifically, in a case of reading the image of the document G transported by the transport apparatus 64, a driving force of the motor 80 (see FIG. 4) is transmitted via the endless belt 82, and the reading apparatus 100 moves to a transport reading position on the end side in the apparatus width direction and stops. The reading apparatus 100 disposed at the transport reading position reads the image of the document G transported by the transport apparatus 64.

On the other hand, as illustrated in FIG. 2, in a case of reading the image of the document G placed on the first transparent plate 62, the reading apparatus 100 disposed at a reading start position (=a position by the solid line in FIG. 2) moves in the apparatus width direction toward a reading end position (=a position by the alternate long and two short dashes line in FIG. 2) along the first transparent plate 62 while reading the image of the document G. As a result, the reading apparatus 100 reads the image of the document G placed on the first transparent plate 62.

Reading Apparatus 100

Next, the reading apparatus 100 will be described.

Figure 7:
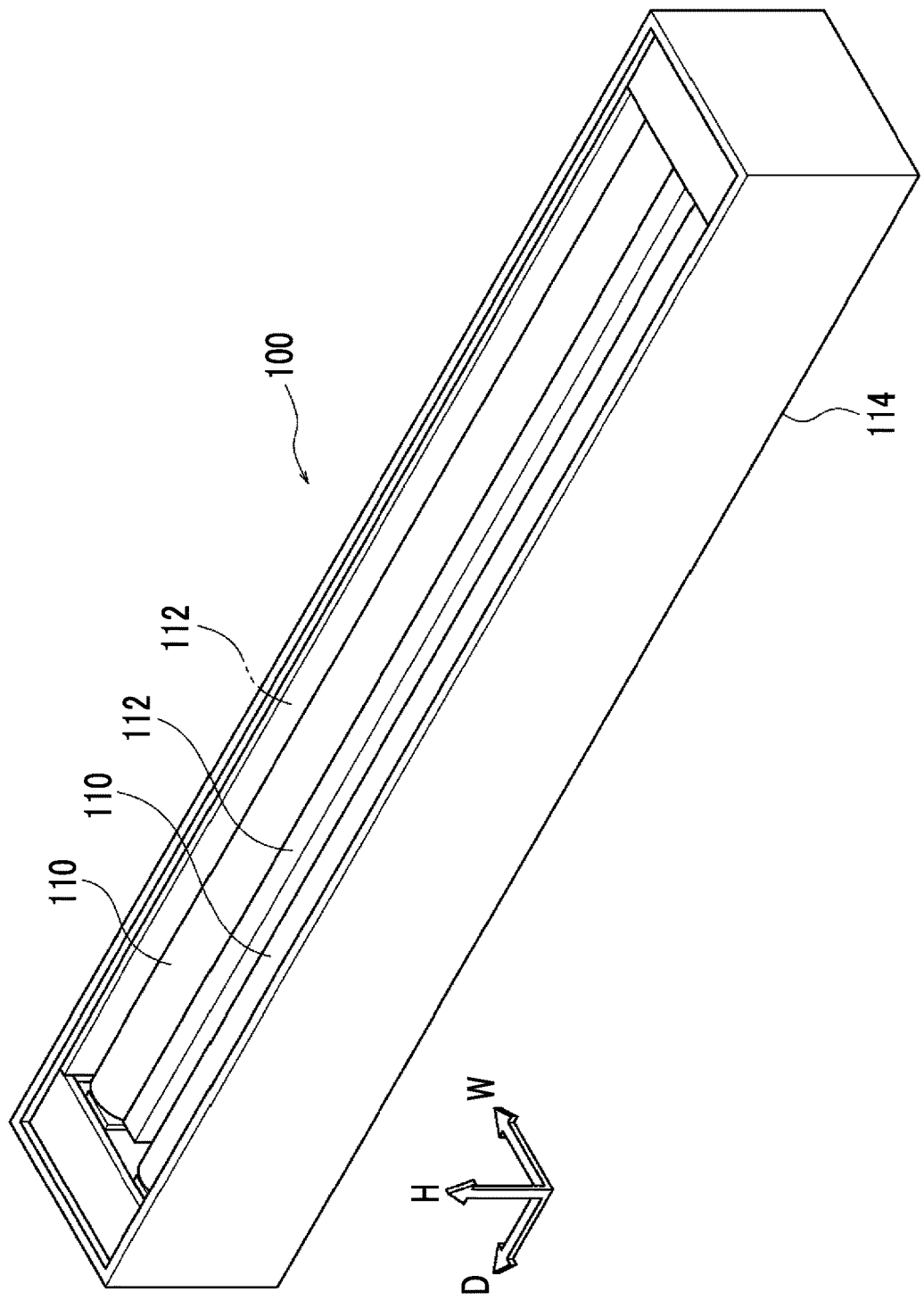
FIG. 7 is a perspective view illustrating the reading apparatus according to the exemplary embodiment of the invention.
Figure 8:
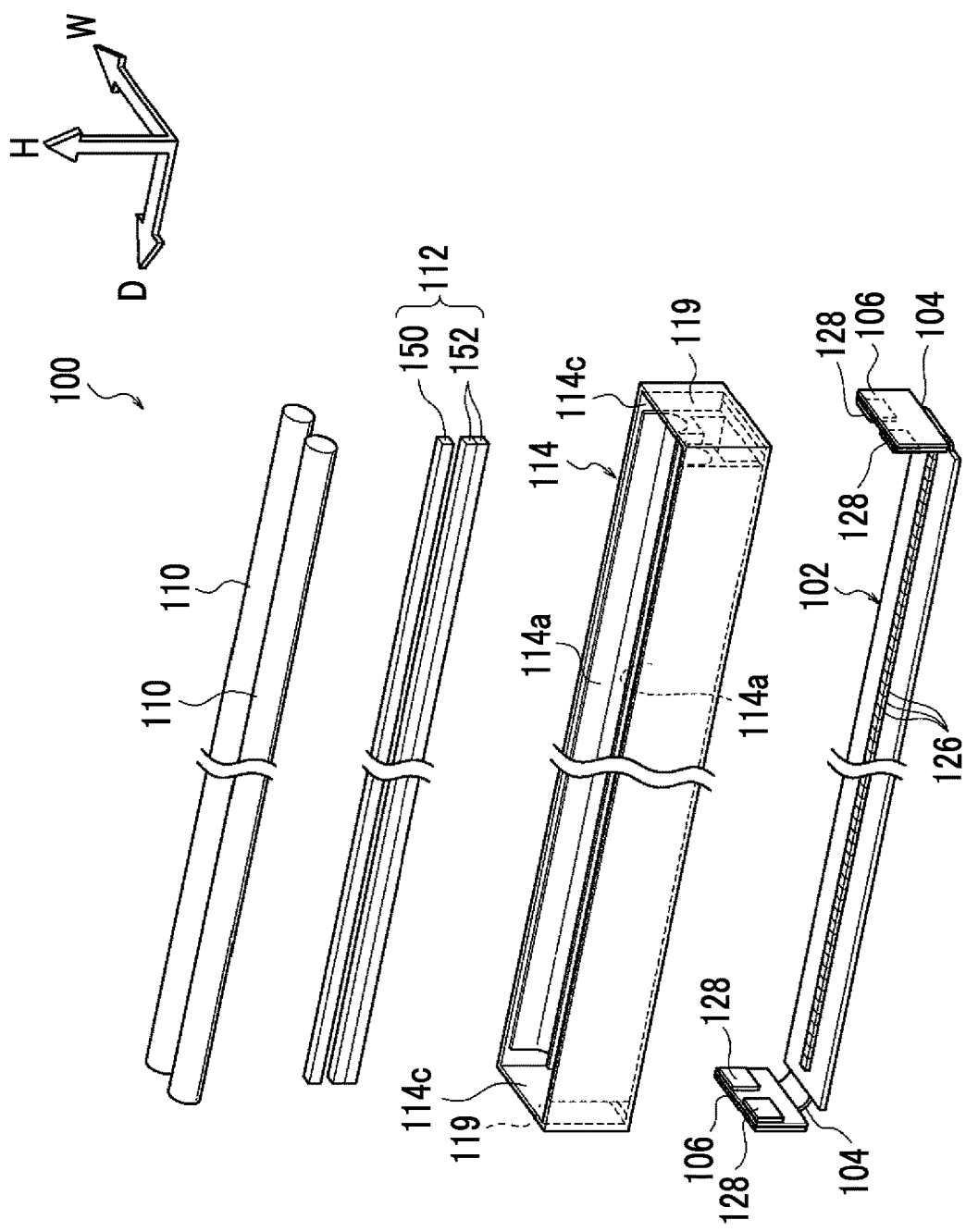
FIG. 8 is an exploded perspective view illustrating the reading apparatus according to the exemplary embodiment of the invention.

The reading apparatus 100 illustrated in FIG. 7 reads an image formed on the document G by using a known contact image sensor (CIS) method. As illustrated in FIG. 8, the reading apparatus 100 includes a light receiving substrate 102, a pair of wiring cables 104 connected to the light receiving substrate 102, and rigidity substrates 106 respectively connected to the wiring cables 104, and a light emitting element 128 mounted on the rigidity substrate 106. Further, the reading apparatus 100 includes a pair of light guide bodies 110 (=light guides) having a cylindrical shape, a light collecting portion 112 which collects light (=reflection light) reflected from the document G, and a housing 114. The light receiving substrate 102 is an example of a substrate.

Housing 114

Figure 9:
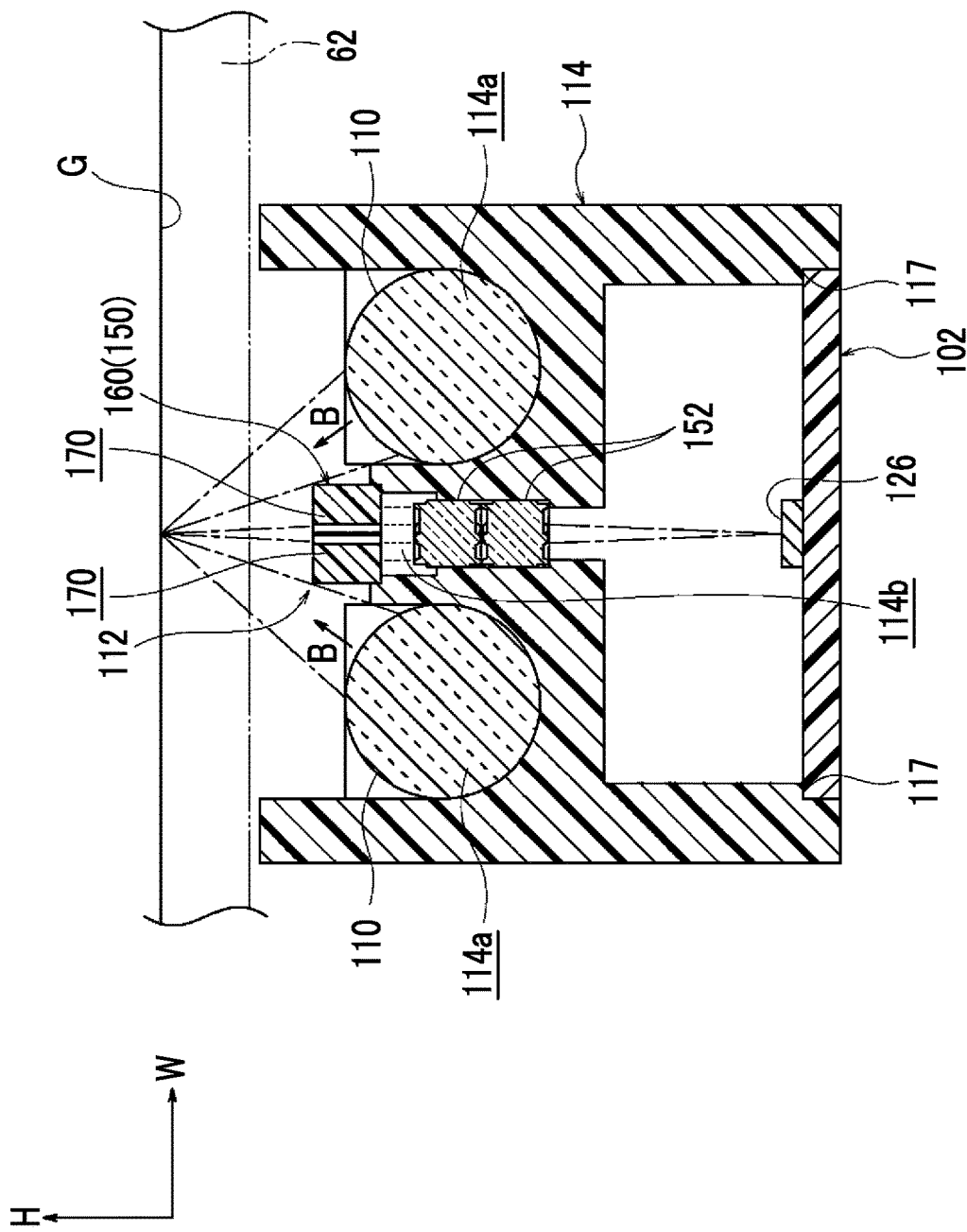
FIG. 9 is a cross-sectional view illustrating the reading apparatus according to the exemplary embodiment of the invention.

As illustrated in FIG. 8, the housing 114 has a box shape extending in the apparatus depth direction. As illustrated in FIG. 9, in the housing 114, a pair of light guide body accommodating portions 114a in which the pair of light guide bodies 110 are respectively accommodated are formed, and a lens accommodating portion 114b in which the light collecting portion 112 is accommodated is formed between the pair of light guide body accommodating portions 114a. Further, in the housing 114, a pair of substrate accommodating portions 114c in which the rigidity substrate 106 is accommodated are formed so as to sandwich the light guide body accommodating portion 114a from the apparatus depth direction, as illustrated in FIG. 10.

Light Guide Body Accommodating Portion 114a

Figure 10:
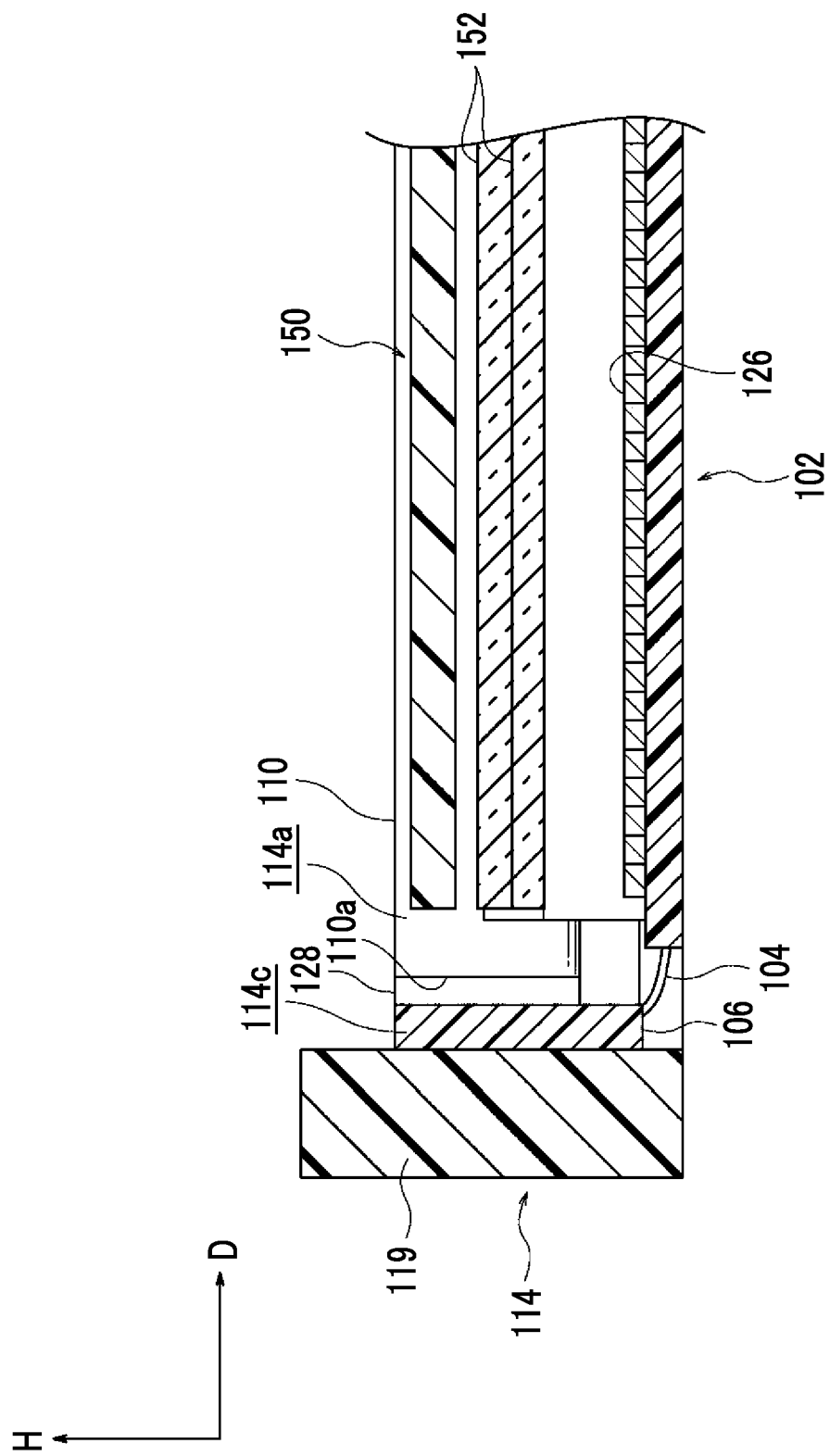
FIG. 10 is a cross-sectional view illustrating the reading apparatus according to the exemplary embodiment of the invention.

As illustrated in FIGS. 9 and 10, the pair of light guide body accommodating portions 114a are formed side by side in the apparatus width direction, and each light guide body accommodating portion 114a extends in the apparatus depth direction. Further, a cross-section of each light guide body accommodating portion 114a intersecting in the longitudinal direction has a semicircular shape with an upper opening.

Lens Accommodating Portion 114b

As illustrated in FIG. 9, the lens accommodating portion 114b is formed between the pair of light guide body accommodating portions 114a in the apparatus width direction, and penetrates the housing 114 in the apparatus upward-downward direction.

Substrate Accommodating Portion 114c

As illustrated in FIG. 10, the pair of substrate accommodating portions 114c are formed on the back side and the front side of the light guide body accommodating portion 114a in the apparatus depth direction. Specifically, the substrate accommodating portion 114c is formed between one of wall portions 119 at both ends of the housing 114 in the apparatus depth direction and the light guide body accommodating portion 114a.

Others

As illustrated in FIG. 9, a stepped surface 117 is formed in a lower portion of the housing 114 in contact with an upper surface of an edge portion of the light receiving substrate 102.

Light Guide Body 110

As illustrated in FIG. 9, the light guide body 110 is accommodated in the light guide body accommodating portion 114a of the housing 114, and is formed in a cylindrical shape extending in the apparatus depth direction by a transparent material (for example, acrylic resin). A pair of light guide bodies 110 are provided side by side in the apparatus width direction.

The light guide body 110 is expandable and contractible in the apparatus depth direction, and a central portion of the light guide body 110 in the longitudinal direction is fixed to the housing 114 by a fixing portion (not illustrated). In a state in which the light guide body 110 is fixed to the housing 114, an end surface 110a of the light guide body 110 and the wall portion 119 of the housing 114 are separated from each other in the apparatus depth direction, and this separated portion is the substrate accommodating portion 114c (see FIG. 10).

In addition, in the light guide body 110, a reflecting member (not illustrated) which causes light incident from the end surface 110a of the light guide body 110 to travel in the longitudinal direction and emits the light toward the upper side of the light collecting portion 112 (in the arrow B direction in FIG. 9) is provided.

Light Collecting Portion 112

As illustrated in FIG. 9, the light collecting portion 112 is accommodated in the lens accommodating portion 114b of the housing 114, and the light collecting portion 112 includes a light-shielding member 150 and a pair of lens arrays 152. Details of the pair of lens arrays 152 and the light-shielding member 150 will be described below.

Light Receiving Substrate 102

As illustrated in FIG. 9, the light receiving substrate 102 is disposed at the lower end of the housing 114 with a plate thickness direction being the apparatus upward-downward direction. The light receiving substrate 102 is fixed to the housing 114 by a fixing section (not illustrated) in a state in which the upper surface of the edge portion of the light receiving substrate 102 is in contact with the stepped surface 117 of the housing 114.

The light receiving substrate 102 has a rectangular shape extending in the apparatus depth direction, as viewed from above. In addition, on an upper surface of the light receiving substrate 102, a plurality of light receiving elements 126 are provided (=mounted) side by side in the apparatus depth direction. Further, the light receiving element 126 provided on the light receiving substrate 102 faces the light collecting portion 112 in the apparatus upward-downward direction. The light receiving element 126 is an example of an element.

Wiring Cable 104

The wiring cables 104 are so-called flexible flat cables, which are provided in pairs and of which base ends are connected to both ends of the light receiving substrate 102 in the apparatus depth direction, as illustrated in FIG. 8. One base end of one wiring cable 104 is connected to the end of the light receiving substrate 102 on the back side (left side in FIG. 8) in the apparatus depth direction, and the other base end of the wiring cable 104 is connected to the end portion on the front side of the light receiving substrate 102 in the apparatus depth direction (right side in FIG. 8).

Rigidity Substrate 106

As illustrated in FIG. 8, the rigidity substrates 106 are provided in pairs, are connected to a tip of the wiring cable 104, and have a rectangular shape extending in the apparatus width direction as viewed from the apparatus depth direction.

In addition, two light emitting diodes (LEDs) 128 (hereinafter, referred to as "light emitting elements 128") arranged in the apparatus width direction are provided on one surface (=surfaces facing each other) of each of the rigidity substrates 106.

As illustrated in FIG. 10, the light emitting element 128 provided on the rigidity substrate 106 is accommodated in the substrate accommodating portion 114c of the housing 114 in a state of facing the end surface 110a of the light guide body 110.

Action of Reading Apparatus 100

Next, an action of the reading apparatus 100 will be described.

The light emitting element 128 illustrated in FIG. 10 irradiates the end surface 110a of the light guide body 110 with light. Further, the light guide body 110 guides the light incident from the end surface 110a of the light guide body 110, in the longitudinal direction of the light guide body 110. As illustrated in FIG. 9, the light guide body 110 emits the light toward the upper side of the light collecting portion 112 (in the arrow B direction in FIG. 9) by a reflecting member (not illustrated) formed along the longitudinal direction of the light guide body 110.

Further, the light collecting portion 112 guides (condenses) the light (=reflection light) emitted from the light guide body 110, irradiated on the document G, and reflected from the document G, to the light receiving element 126. In addition, the light receiving element 126 receives the light (=reflection light) reflected from the document G and converts the light into an electrical signal. In this manner, the reading apparatus 100 reads the image formed on the document G.

Central Portion Configuration

Next, a configuration of the housing 114 in which the pair of lens arrays 152 and the light-shielding member 150 are attached, the pair of lens arrays 152, and the light-shielding member 150 will be described. As illustrated in FIG. 9, the light-shielding member 150, the pair of lens arrays 152, and the light receiving substrate 102 are arranged from the document G side in this order from the upper side to the lower side. In the following description, in some cases, the lens array 152 on the light-shielding member 150 side is referred to as one lens array 152, and the lens array 152 on the light receiving substrate 102 side is referred to as the other lens array 152.

Housing 114

Figure 11:
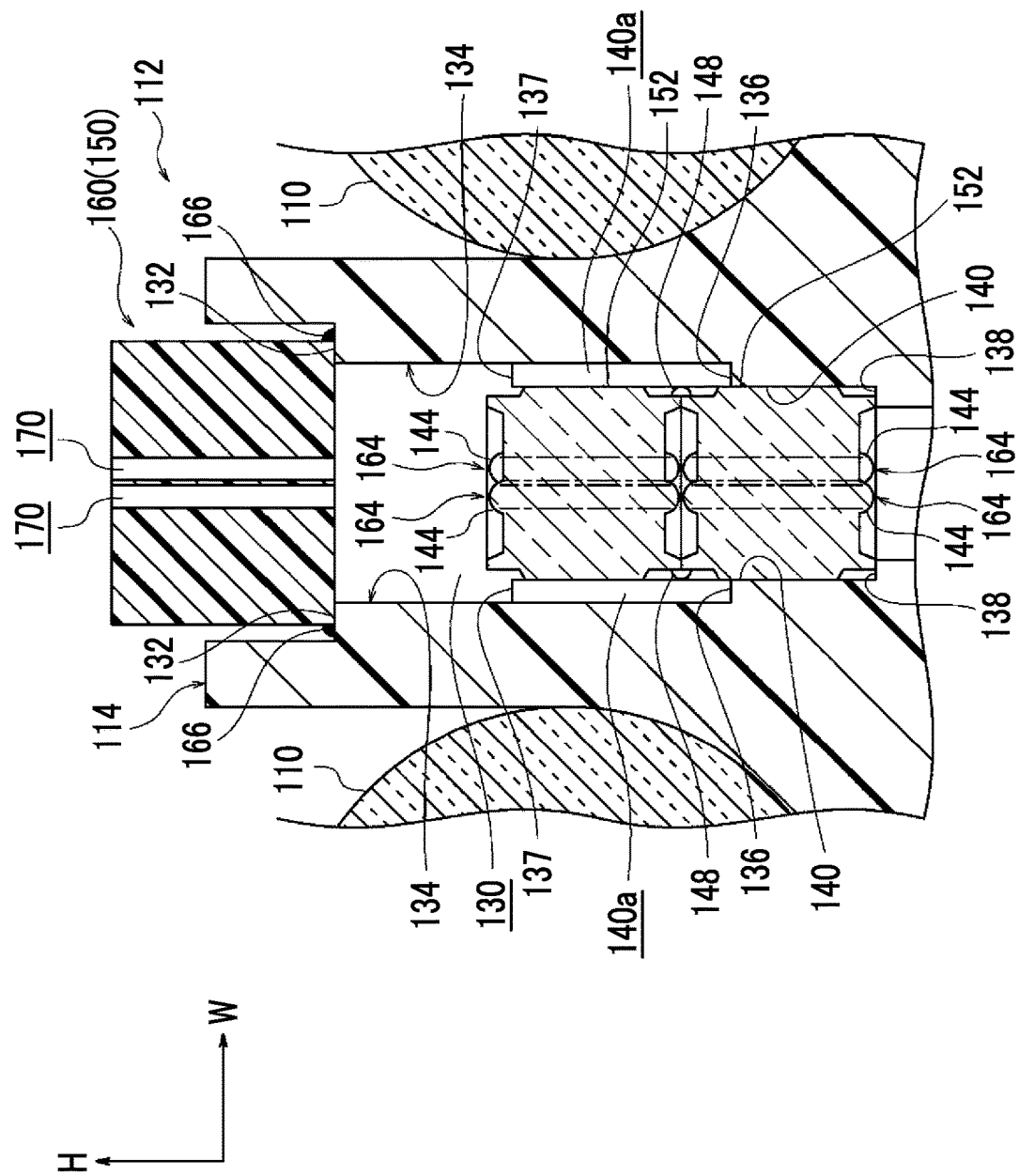
FIG. 11 is an enlarged cross-sectional view illustrating the reading apparatus according to the exemplary embodiment of the invention.

As illustrated in FIG. 11, in the housing 114, an opening portion 130 which extends in the apparatus depth direction, and penetrates the housing 114 and opens in the apparatus upward-downward direction is formed. A pair of upward surfaces 132 extending in the apparatus depth direction and facing upward are formed at an upper end of the opening portion 130 in the housing 114. The pair of upward surfaces 132 are arranged with opening portions 130 in between in the apparatus width direction. The light-shielding member 150 is placed on the pair of upward surfaces 132 from above and fixed to the housing 114 by a fixing material 166.

Further, the housing 114 is formed with a pair of side surfaces 134 extending in the apparatus depth direction and sandwiching the opening portion 130 from the apparatus width direction, and a pair of stepped surfaces 136 facing upward, a pair of stepped surfaces 137 extending in the apparatus depth direction and facing upward, and a pair of stepped surfaces 138 extending in the apparatus depth direction and facing upward are formed in the pair of side surfaces 134. Here, the pair of stepped surfaces 136 are a pair of bottom surfaces in a pair of recess portions 140a (see FIG. 17) formed at intervals in the apparatus depth direction on the pair of stepped surfaces 137. In addition, the pair of upward surfaces 132, the pair of stepped surfaces 137, the pair of stepped surfaces 136, and the pair of stepped surfaces 138 are arranged in this order from the upper side to the lower side. The pair of lens arrays 152 are placed on the pair of stepped surfaces 138 from above and fixed to the housing 114 by a fixing material (not illustrated) injected into the recess portion 140a.

In addition, the side surface 134 of a portion between the stepped surface 138 and the stepped surface 137 in the apparatus upward-downward direction is a pair of sandwiching surfaces 140 which sandwich the pair of lens arrays 152 from the apparatus width direction.

Lens Array 152

The lens array 152 is integrally formed by using polymethylmethacrylate (PMMA), which is a transparent resin material, and has a rectangular parallelepiped shape extending in the apparatus depth direction. The lens array 152 is an example of an optical member.

Figure 12:
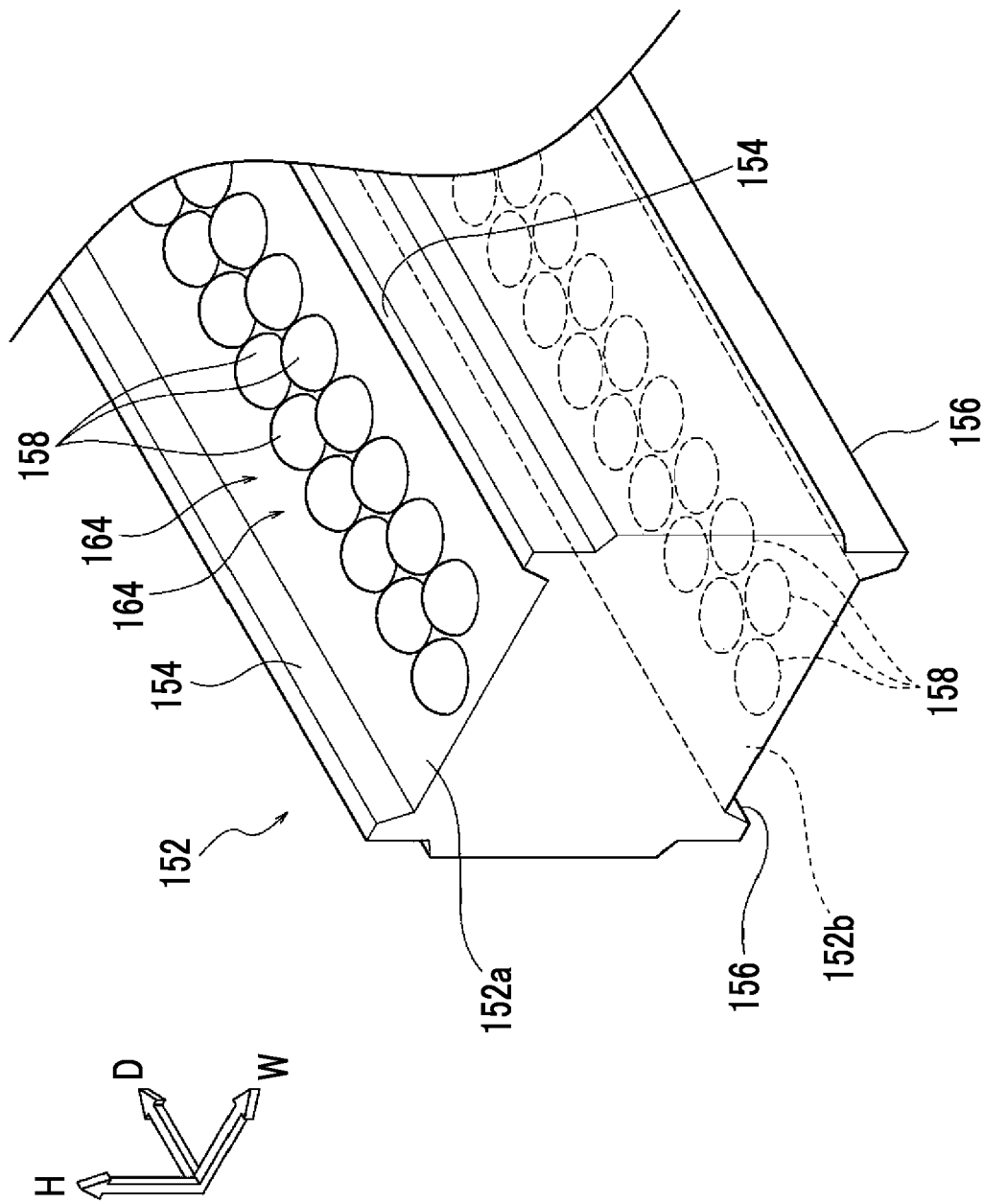
FIG. 12 is an enlarged perspective view illustrating a lens array provided in the reading apparatus according to the exemplary embodiment of the invention.
Figure 13:
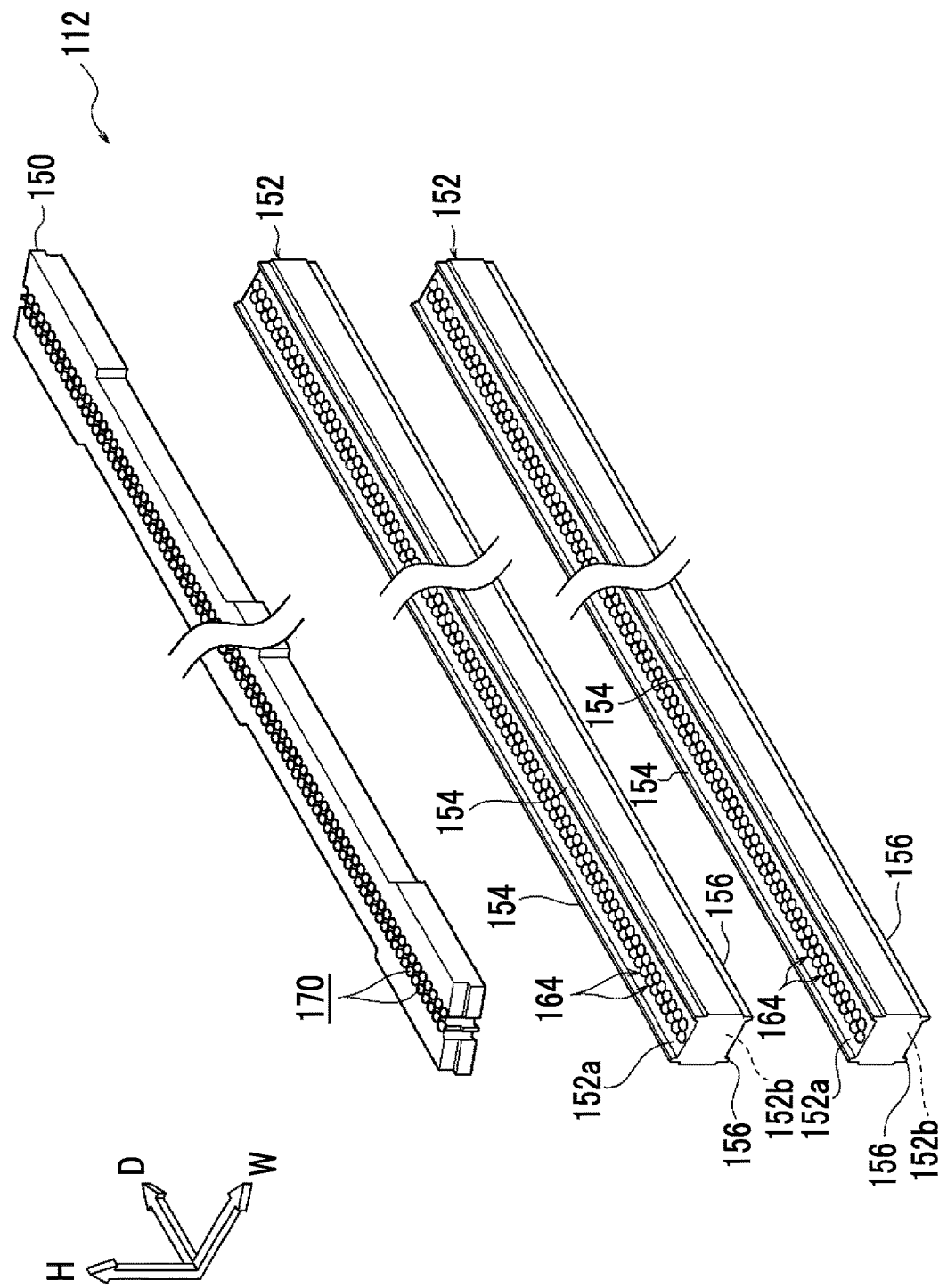
FIG. 13 is an exploded perspective view illustrating the lens array and a light-shielding member provided in the reading apparatus according to the exemplary embodiment of the invention.

As illustrated in FIGS. 12 and 13, the lens array 152 has an upper surface 152a in a rectangular shape which faces upward and extends in the apparatus depth direction as viewed from above, and a lower surface 152b in a rectangular shape which faces downward and extends in the apparatus depth direction as viewed from below. Further, the lens array 152 includes a projection 154 being formed on both end edges of the upper surface 152a in the apparatus width direction, projecting upward from the upper surface 152a, and extending in the apparatus depth direction and a projection 156 being formed on both end edges of the lower surface 152b in the apparatus width direction, projecting downward from the lower surface 152b, and extending in the apparatus depth direction.

In addition, a plurality of protrusion surfaces 158 projecting from a planar portion of the upper surface 152a or a planar portion of the lower surface 152b are respectively formed on the upper surface 152a and the lower surface 152b. The protrusion surface 158 is spherical, and the projection amount from the planar portion of the upper surface 152a or the planar portion of the lower surface 152b of the protrusion surface 158 is made smaller than the projection amount from the planar portions of the lower surfaces 152b of the projections 154 and 156 or the planar portion of the upper surface 152a. The projection amount of the plurality of protrusion surfaces 158 projecting from the planar portion of the upper surface 152a and the projection amount of the plurality of protrusion surfaces 158 projecting from the planar portion of the lower surface 152b are identical. In addition, the projection amount of the projection 154 projecting from the planar portion of the upper surface 152a and the projection amount of the projection 156 projecting from the planar portion of the lower surface 152b are identical.

Figure 14:
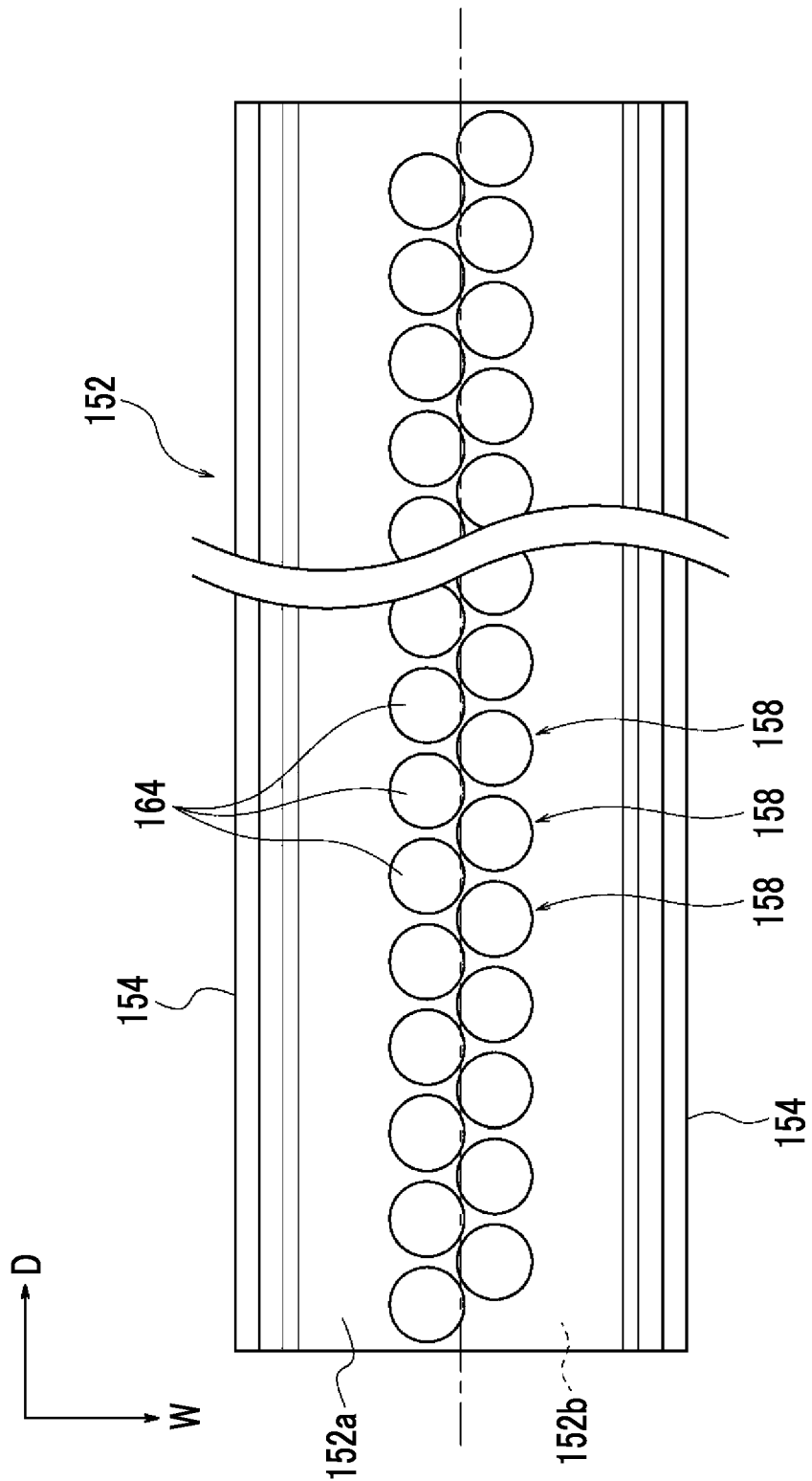
FIG. 14 is a plan view illustrating the lens array provided in the reading apparatus according to the exemplary embodiment of the invention.

The spherical protrusion surfaces 158 are arranged in two rows in a staggered pattern along the apparatus depth direction (see FIG. 14). The number of protrusion surfaces 158 arranged in one row and the number of protrusion surfaces 158 arranged in the other row are identical. In addition, "staggered" means "alternately". The protrusion surface 158 projecting from the upper surface 152a and the protrusion surface 158 projecting from the lower surface 152b are arranged at the same positions as viewed from above. In other words, in one lens array 152 (one lens array 152 or the other lens array 152), the protrusion surface 158 projecting from the upper surface 152a and the protrusion surface 158 projecting from the lower surface 152b face each other in the apparatus upward-downward direction. In addition, an interval of the protrusion surfaces 158 adjacent to each other in the apparatus depth direction, an interval of the protrusion surfaces 158 adjacent to each other in an inclined direction to one side with respect to the apparatus depth direction, and an interval of the protrusion surfaces 158 adjacent to each other in an inclined direction to the other side with respect to the apparatus depth direction are identical.

Figure 15:
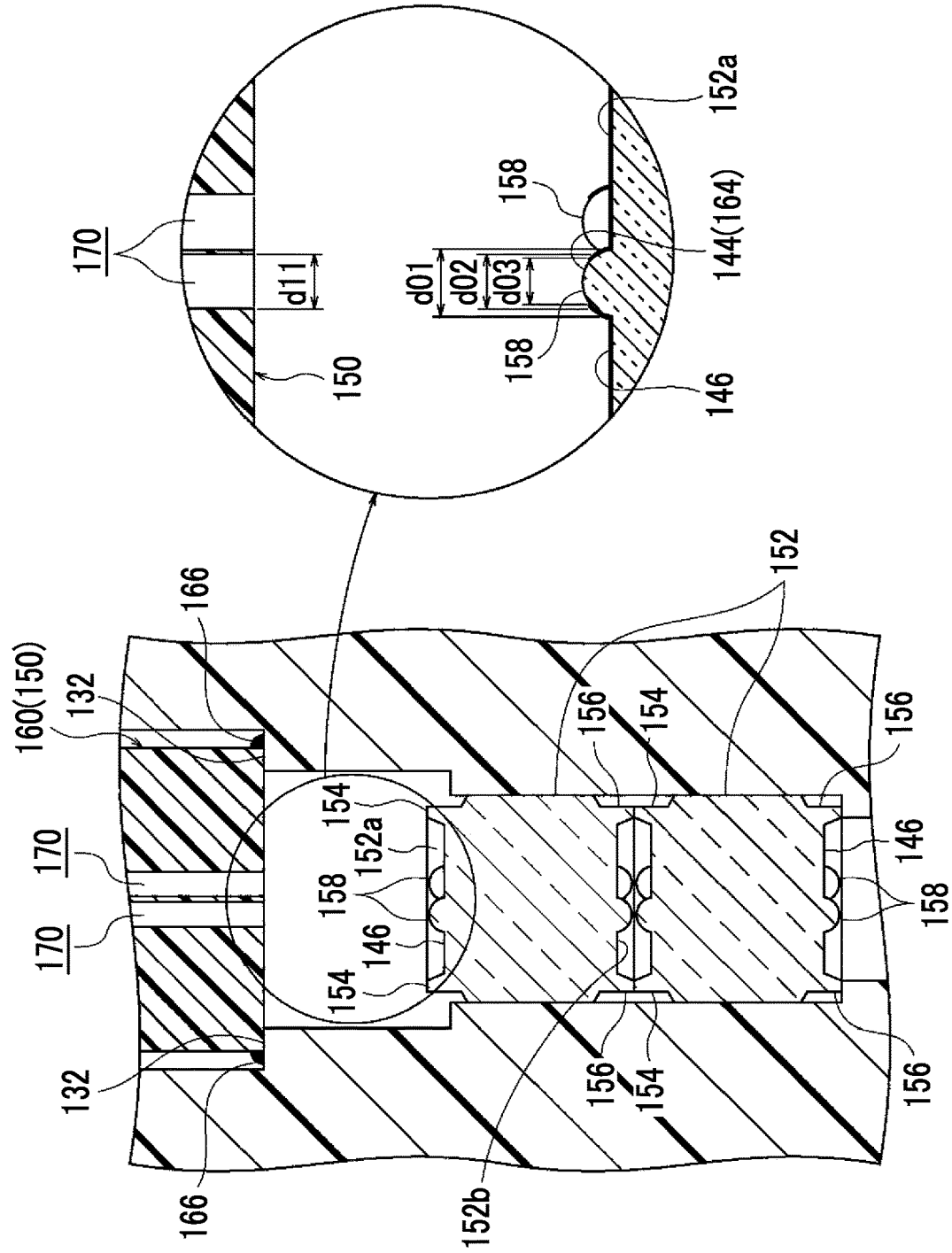
FIG. 15 is an enlarged cross-sectional view illustrating the lens array provided in the reading apparatus according to the exemplary embodiment of the invention.

As illustrated in FIG. 15, the lens array 152 is disposed so that the protrusion surface 158 formed on the lens array 152 faces a through-hole 170 formed in the light-shielding member 150 in the apparatus upward-downward direction.

Further, a diameter of the protrusion surface 158 (d01 in FIG. 15 and the diameter of the protrusion surface 158 as viewed from above) is larger than a diameter of the through-hole 170 of the light-shielding member 150 (d11 in FIG. 15).

A portion of the protrusion surface 158 facing the through-hole 170 in the apparatus upward-downward direction is a lens surface 144, in the present exemplary embodiment. In other words, a portion of the lens array 152 at which the through-hole 170 is projected downward is the lens surface 144. As illustrated in FIG. 11, a thick lens 164 corresponding to a rod lens in a rod lens array is formed by the lens surface 144 formed on the upper surface 152a and the lens surface 144 formed on the lower surface 152b. In other words, the thick lens 164 is configured with the pair of protrusion surfaces 158 facing each other in the apparatus upward-downward direction in one lens array 152. Therefore, in the present exemplary embodiment, an optical axis direction of the thick lens 164 is the apparatus upward-downward direction.

That is, the light-shielding member 150, one lens array 152, the other lens array 152, and the light receiving substrate 102 are arranged in this order from the document G side in the optical axis direction of the thick lens 164. The thick lens 164 is an example of a lens.

Further, in the present exemplary embodiment, one in which the top and bottom (up and down) of one lens array 152 is reversed (=rotation by 180 degrees) is used, as the other lens array 152. That is, one lens array 152 and the other lens array 152 are symmetrical in the apparatus upward-downward direction.

Figure 16:
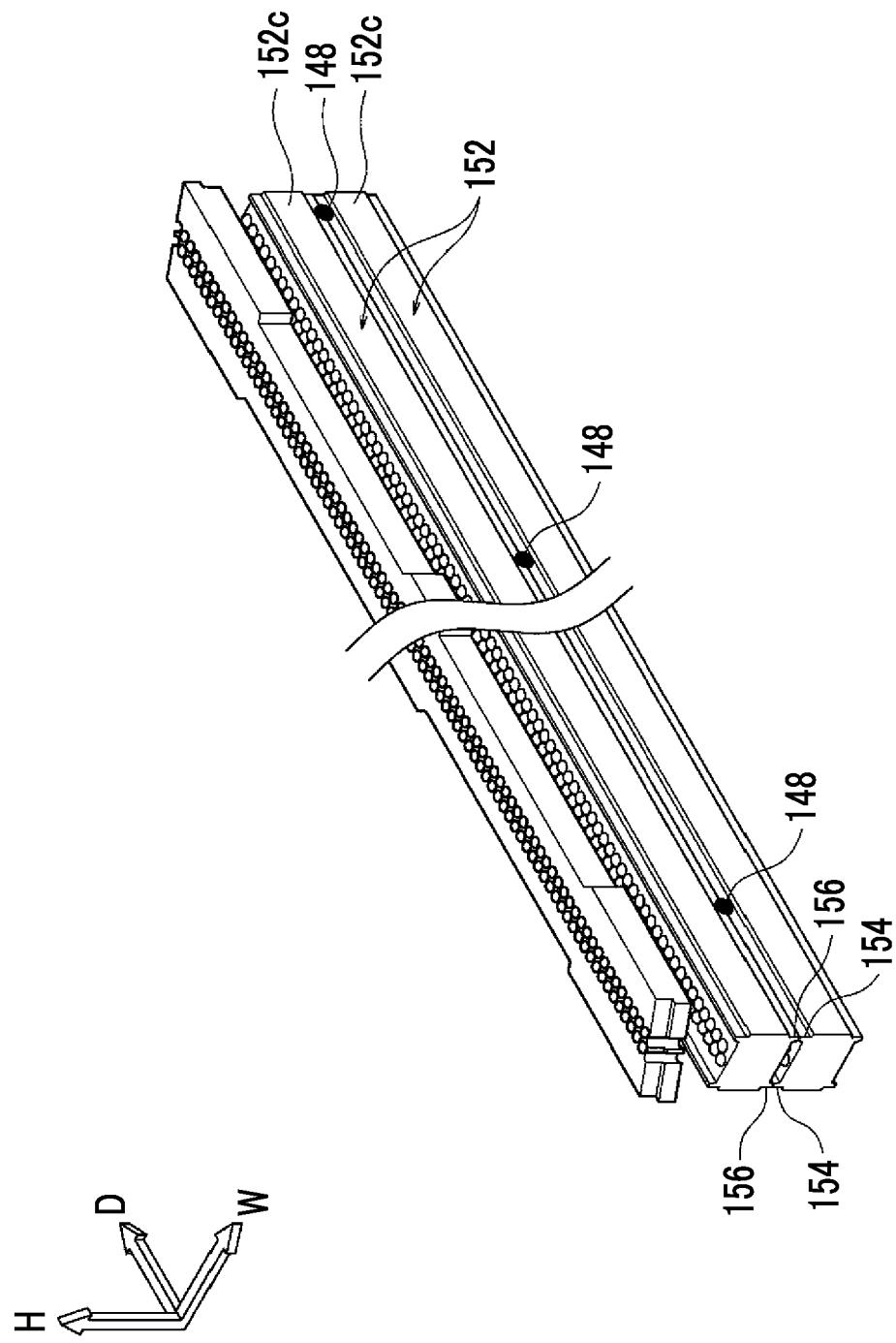
FIG. 16 is a perspective view illustrating the lens array and the light-shielding member provided in the reading apparatus according to the exemplary embodiment of the invention.

In addition, as illustrated in FIGS. 14 and 16, top portions of the projections 154 and 156 of each lens array 152 are abutted so that the thick lens 164 of one lens array 152 and the thick lens 164 of the other lens array 152 are overlapped with each other as viewed from above.

In a state in which the top portions of the projections 154 and 156 of each lens array 152 abutted against each other, a fixing material 148 (for example, a UV curable adhesive) is applied so as to straddle each lens array 152, so that the lens arrays 152 are fixed to each other by the fixing material 148. Specifically, as illustrated in FIG. 16, on a side surface 152c of the lens array 152, the fixing materials 148 are provided at a plurality of locations at intervals in the apparatus depth direction, and the fixing material 148 projects from the side surface 152c of the lens array 152 toward both sides of the apparatus width direction. The fixing material 148 is an example of a protrusion portion.

Figure 17:
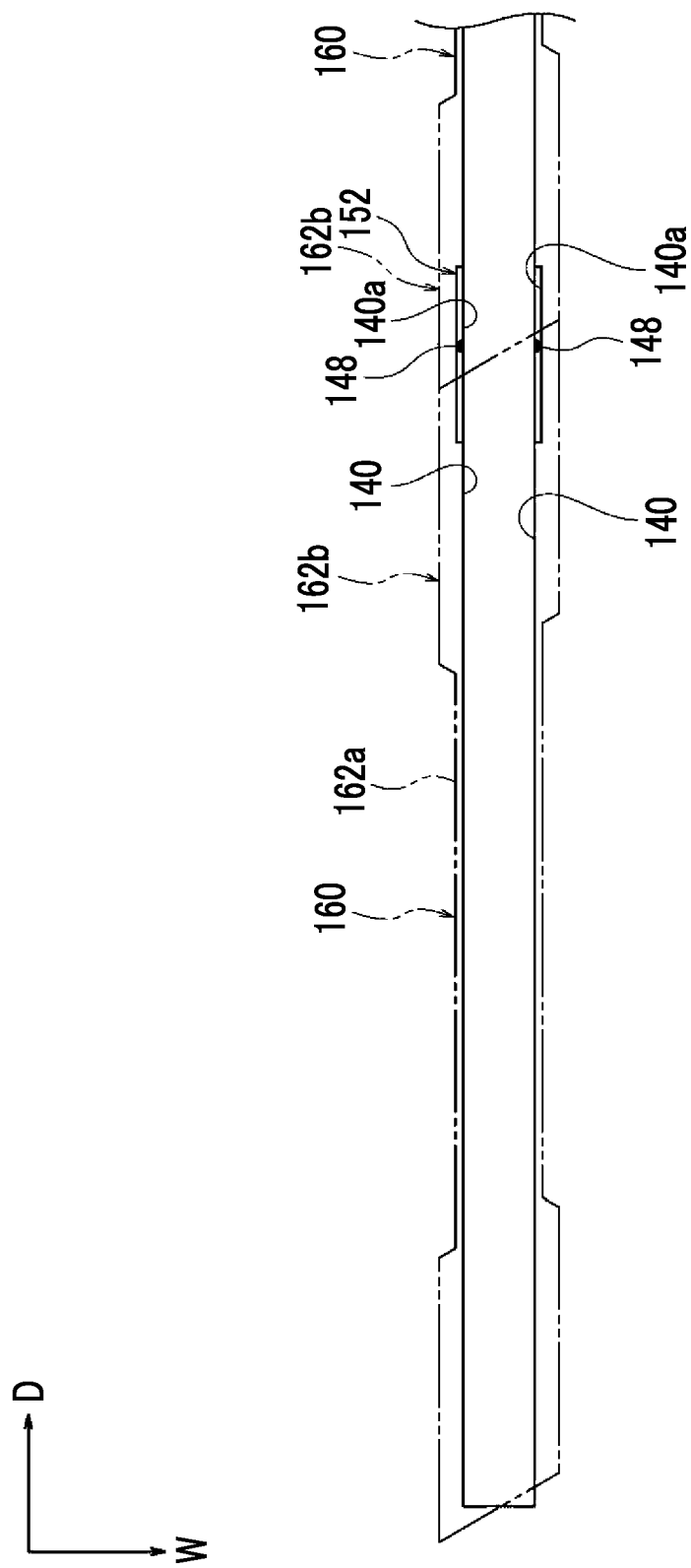
FIG. 17 is a plan view illustrating the lens array and the light-shielding member provided in the reading apparatus according to the exemplary embodiment of the invention.

Therefore, as illustrated in FIGS. 11 and 17, the recess portion 140a is formed on the sandwiching surface 140 of the housing 114 so as to escape from the fixing material 148 projecting from the side surface 152c (so as to prevent the fixing material 148 from coming into contact with the sandwiching surface 140). The recess amount of the recess portion 140a from the sandwiching surface 140 is larger than the projection amount of the fixing material 148 from the side surface 152c. In addition, the recess portion 140a is formed deeper than an area in which the fixing material 148 for fixing the pair of lens arrays 152 is disposed in the apparatus upward-downward direction.

Further, as illustrated in FIG. 15, a light-shielding film 146 is formed on the upper surface 152a of one lens array 152 disposed on the light-shielding member 150 side. Specifically, the light-shielding film 146 is formed on a planar portion on the upper surface 152a and an outer peripheral portion of the lens surface 144. In other words, the light-shielding film 146 is formed on a planar portion of the upper surface 152a, the protrusion surface 158 excluding the lens surface 144 from the upper surface 152a, and a peripheral edge portion of the lens surface 144. Here, the "light-shielding film" is a film having a light transmittance (JIS K 7105) equal to or less than 30 [%]. The light transmittance of the light-shielding film 146 may be equal to or less than 30 [%], is preferably equal to or less than 15 [%], and is more preferably equal to or less than 5 [%], for example. As described above, the light-shielding film functions as a transmission suppressing section for suppressing transmission of light.

In the present exemplary embodiment, as an example, the light-shielding film 146 is a black coating film (=a coating film) and is formed on the upper surface 152a by an ink jet method.

As described above, in the present exemplary embodiment, a portion facing the through-hole 170 in the apparatus upward-downward direction is the lens surface 144 of the thick lens 164. In other words, a diameter of the thick lens 164 (d02 in FIG. 15) is identical with the diameter d11 of the through-hole 170.

A diameter of an exposed portion of the lens surface 144 on which the light-shielding film 146 is not formed (d03 in FIG. 15) is smaller than the diameter d02 of the lens surface 144. In other words, the diameter d03 of the exposed portion is smaller than the diameter d11 of the through-hole 170. The upper surface 152a of one lens array 152 is an example of a surface.

That is, the following equation (1) holds for the diameter d01 of the protrusion surface 158, the diameter d02 of the thick lens 164, and the diameter d03 of the exposed portion of the lens surface 144 of the thick lens 164 on which the light-shielding film 146 is not covered.

$$d01 > d02 > d03 \quad (1)$$

In the present exemplary embodiment, as an example, the diameter d01 is 0.5 [mm], the diameter d02 of the lens surface 144 is 0.45 [mm], and the diameter d03 of the exposed portion of the lens surface 144 is 0.4 [mm]. In addition, a distance (a pitch) between the adjacent thick lenses 164 is 0.55 [mm].

In addition, as described above, one in which the top and bottom of the one lens array 152 is reversed (=rotation by 180 degrees) is used, as the other lens array 152. Therefore, the light-shielding film 146 is formed on the lower surface 152b of the other lens array 152 in the same manner as the upper surface 152a of the one lens array 152. The lower surface 152b of the other lens array 152 is an example of the other surface. The pair of lens arrays 152 are fixed to the housing 114 by using a fixing material (for example, a UV curable adhesive).

Light-Shielding Member 150

Figure 18:
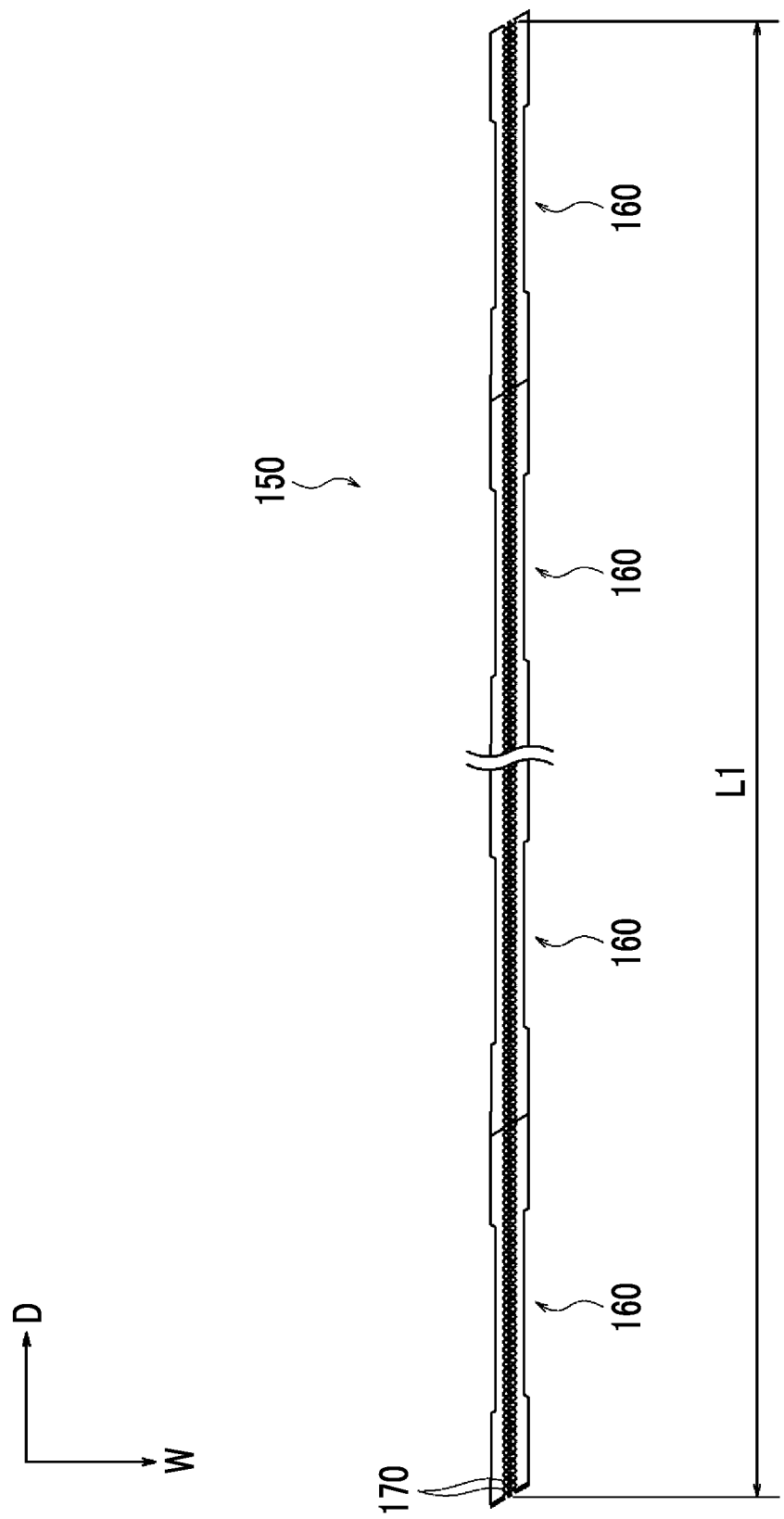
FIG. 18 is a plan view illustrating the light-shielding member provided in the reading apparatus according to the exemplary embodiment of the invention.
Figure 19:
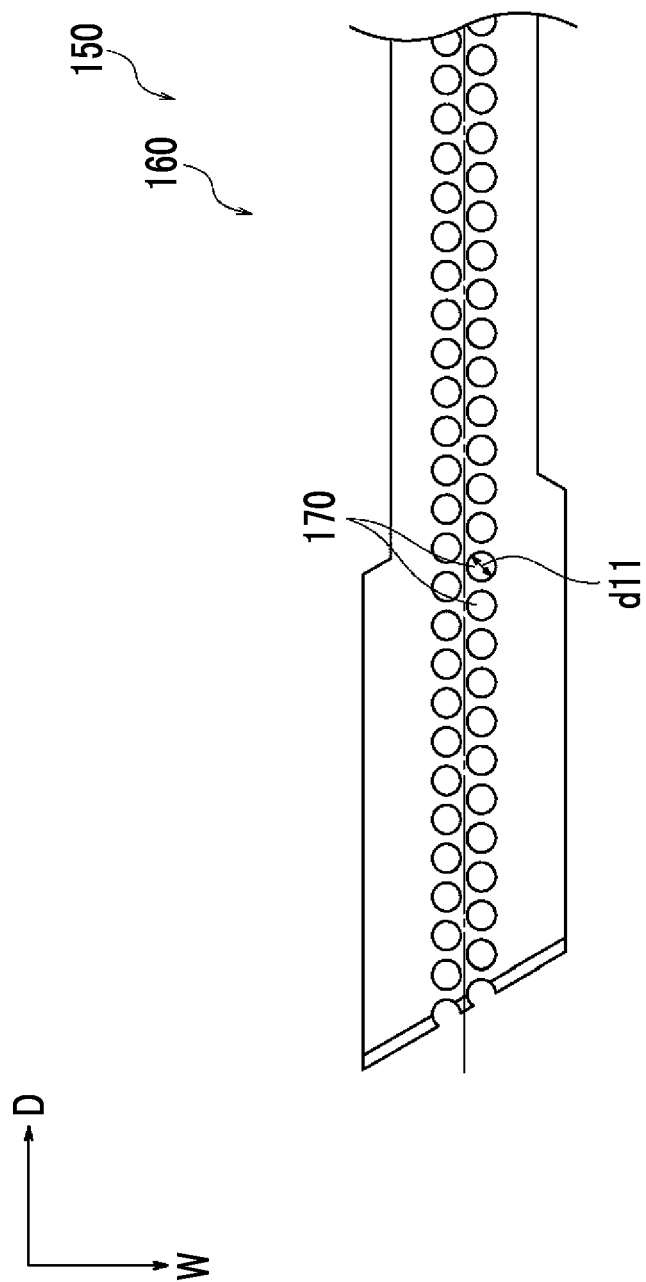
FIG. 19 is an enlarged plan view illustrating the light-shielding member provided in the reading apparatus according to the exemplary embodiment of the invention.

As illustrated in FIGS. 18 and 19, the light-shielding member 150 extends in the apparatus depth direction, and a plurality of cylindrical through-holes 170 penetrating through the light-shielding member 150 in the apparatus upward-downward direction are formed. The light-shielding member 150 is a member for blocking light which does not pass through the through-hole 170 (=unnecessary light, for example, light in a direction inclined from the apparatus upward-downward direction) by passing the light through the through-hole 170. In other words, the light-shielding member 150 is a member for blocking light unnecessary for reading an image (=unnecessary light, for example, light in a direction inclined from the optical axis direction of the thick lens 164) by passing the light through the through-hole 170. The apparatus depth direction is an example of one direction.

As illustrated in FIG. 11, the light-shielding member 150 is disposed so that the opening portion 130 formed in the housing 114 and the through-hole 170 face each other in the apparatus upward-downward direction. The through-hole 170 is an example of a through-hole.

The plurality of through-holes 170 overlap with a plurality of lens surfaces 144 (see FIG. 15) formed in the lens array 152 as viewed from above. Therefore, as illustrated in FIGS. 18 and 19, the through-holes 170 are arranged in two rows in a staggered manner along the apparatus depth direction. In addition, a distance between the through-holes 170 adjacent to each other in the apparatus depth direction and a distance between the through-holes 170 adjacent to each other in a direction inclined from the apparatus depth direction are identical with a distance between the adjacent thick lenses 164.

In the present exemplary embodiment, as an example, a length of the light-shielding member 150 in the apparatus depth direction (L1 in FIG. 18) is 336 [mm], and a diameter of the through-hole 170 (d11 in FIG. 19) is 0.45 [mm], as described above. In addition, an interval (a pitch) of the through-holes 170 is 0.55 [mm].

The light-shielding member 150 uses the fixing material 166 (for example, a UV curable adhesive) to fix the twelve light-shielding portions 160 extending in the apparatus depth direction to the housing 114, in a state of being arranged in the apparatus depth direction. Specifically, as illustrated in FIG. 11, the fixing material 166 is provided at a plurality of locations so as to straddle the upward surface 132 of the housing 114 and the light-shielding member 150, and is provided at intervals in the apparatus depth direction.

Light-Shielding Portion 160

The light-shielding portion 160 is integrally formed with a black resin material (for example, acrylonitrile-butadiene-styrene copolymer resin (ABS resin)). In the present exemplary embodiment, as an example, a length of the light-shielding portion 160 in the apparatus depth direction (L2 in FIG. 20A) illustrated in FIG. 20A is 28 [mm], and a thickness of the light-shielding portion 160 in the apparatus upward-downward direction (T01 in FIG. 20B) is 5 [mm].

In addition, as illustrated in FIGS. 20A and 20B, the light-shielding portion 160 includes a base portion 162a extending in the apparatus depth direction and overhanging portions 162b which are respectively arranged on both sides of the base portion 162a in the apparatus depth direction and which overhang to both sides of the base portion 162a in the apparatus width direction. The apparatus width direction is an example of a width direction.

In the present exemplary embodiment, as an example, the overhanging portions 162b respectively overhang by 0.3 [mm] to both sides of the base portion 162a in the apparatus width direction, and a width of the overhanging portion 162b (W2 in FIG. 20A) is set to 2.6 [mm]. In addition, as viewed from above, an outer shape of the light-shielding portion 160 is point-symmetrical based on a center of gravity of the light-shielding portion 160 (G1 illustrated in FIG. 20A).

As illustrated in FIG. 17, as viewed from above, the adjacent overhanging portions 162b of the light-shielding portions 160 cover the entire recess portion 140a formed on the sandwiching surface 140 of the housing 114. As a result, the overhanging portion 162b suppresses light reflected from the document G from entering the lens array 152 through the recess portion 140a. That is, the overhanging portion 162b functions as a suppressing section of suppressing the light from passing through the recess portion 140a.

In addition, as illustrated in FIG. 20A, the through-holes 170 are formed in the light-shielding portion 160, and two U-shaped grooves 172 extending in the apparatus upward-downward direction are formed at both end portions of the light-shielding portion 160 in the apparatus depth direction.

Figure 21:
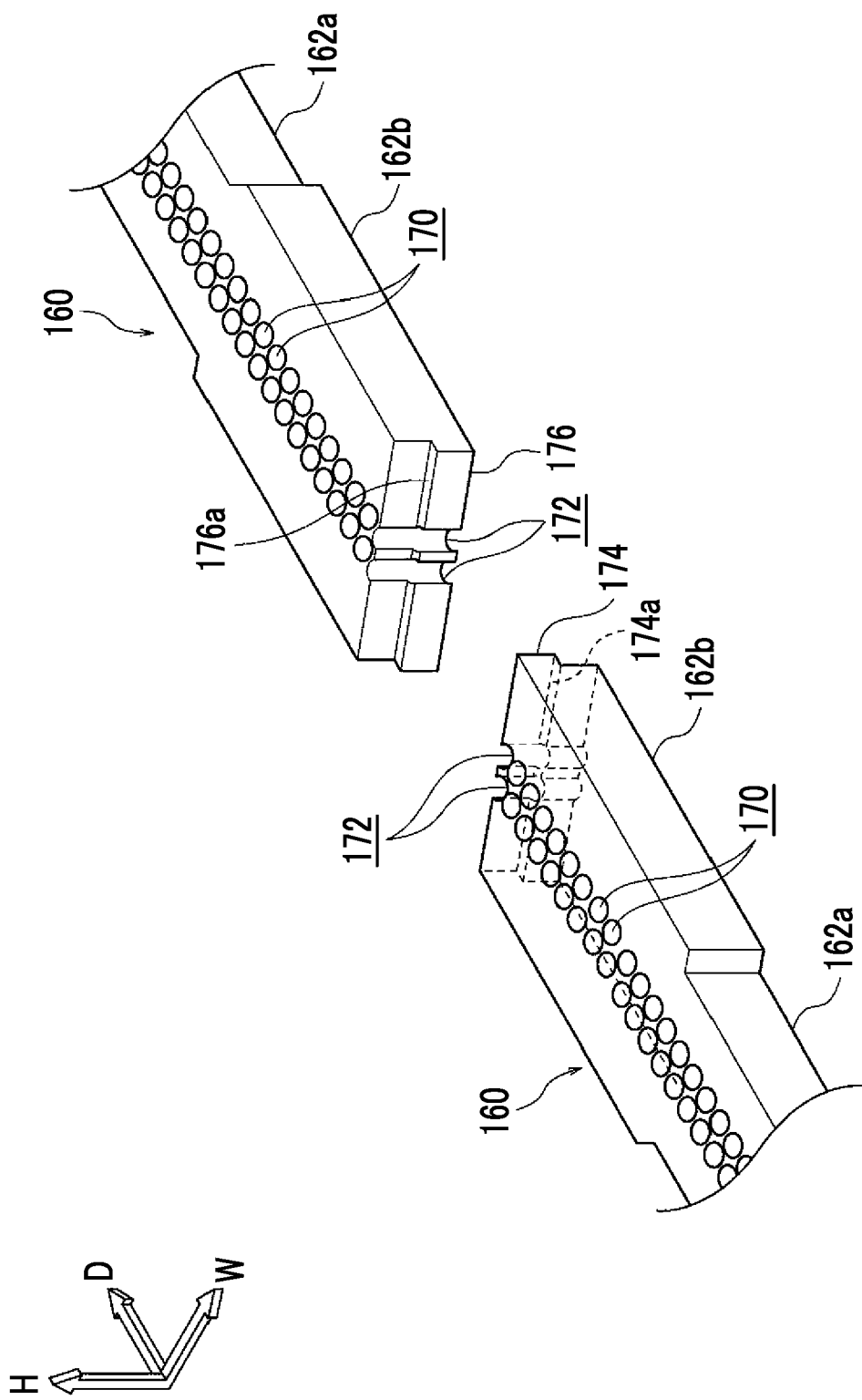
FIG. 21 is a perspective view illustrating an end portion of the light-shielding portion provided in the light-shielding member of the reading apparatus according to the exemplary embodiment of the invention.

Further, as illustrated in FIG. 21, a first projection 174 projecting in the apparatus depth direction is formed at an upper portion in the apparatus upward-downward direction, at one end of the light-shielding portion 160 in the apparatus depth direction. Further, a second projection 176 projecting in the apparatus depth direction is formed in a lower portion in the apparatus upward-downward direction, at the other end of the light-shielding portion 160 in the apparatus depth direction. The first projection 174 and the second projection 176 are split into three by the groove 172.

In addition, as illustrated in FIGS. 22, 23A, and 23B, in a state in which a plurality of light-shielding portions 160 are arranged and fixed in the apparatus depth direction, one through-hole 170 is formed so that the grooves 172 of one light-shielding portion 160 and the other light-shielding portion 160 adjacent to each other face each other. Here, the one light-shielding portion is specifically the light-shielding portion 160 illustrated on the left sides in FIGS. 21 to 23B. In addition, the other light-shielding portion is specifically the light-shielding portion 160 illustrated on the right sides in FIGS. 21 to 23B.

The first projection 174 and the second projection 176 overlap with each other in the apparatus upward-downward direction, in the entire area in the apparatus width direction except for a portion of the two through-holes 170 formed by facing the grooves 172 adjacent in the apparatus depth direction. In other words, the first projection 174 and the second projection 176 overlap with each other in the apparatus upward-downward direction over the entire areas at which the adjacent light-shielding portions 160 are close to each other and face each other in the apparatus upward-downward direction. Further, as illustrated in FIG. 21, an upward surface 176a facing upward is formed on the first projection 174 side of the second projection 176. In addition, a downward surface 174a facing downward is formed on the second projection 176 side of the first projection 174. Therefore, the entire areas at which the adjacent light-shielding portions 160 are close to each other and face each other in the apparatus upward-downward direction is a portion at which the upward surface 176a and the downward surface 174a are close to each other and face each other. Being close to each other means that, for example, an interval equal to or less than 100 μm is formed, and includes a concept that the interval is 0 (=in contact with each other). In addition, the upward surface 176a is an example of an intersection surface.

In addition, a gap is formed between the light-shielding portions 160 adjacent to each other in the apparatus depth direction so as to absorb a variation in the individual light-shielding portions 160. In other words, a length (a projection amount) of the first projection 174 and the second projection 176 in the apparatus depth direction is set in the light-shielding portion 160 so that the gap is formed. Here, the "variation in individual products" is a variation in production of components, and is a variation in a processing dimension of each light-shielding portion 160. The light-shielding portion 160 is long in the apparatus depth direction and is integrally formed of a resin material. Therefore, a length of the light-shielding portion 160 in the apparatus depth direction is easily affected by molding shrinkage, and variation is likely to occur.

Figure 24:
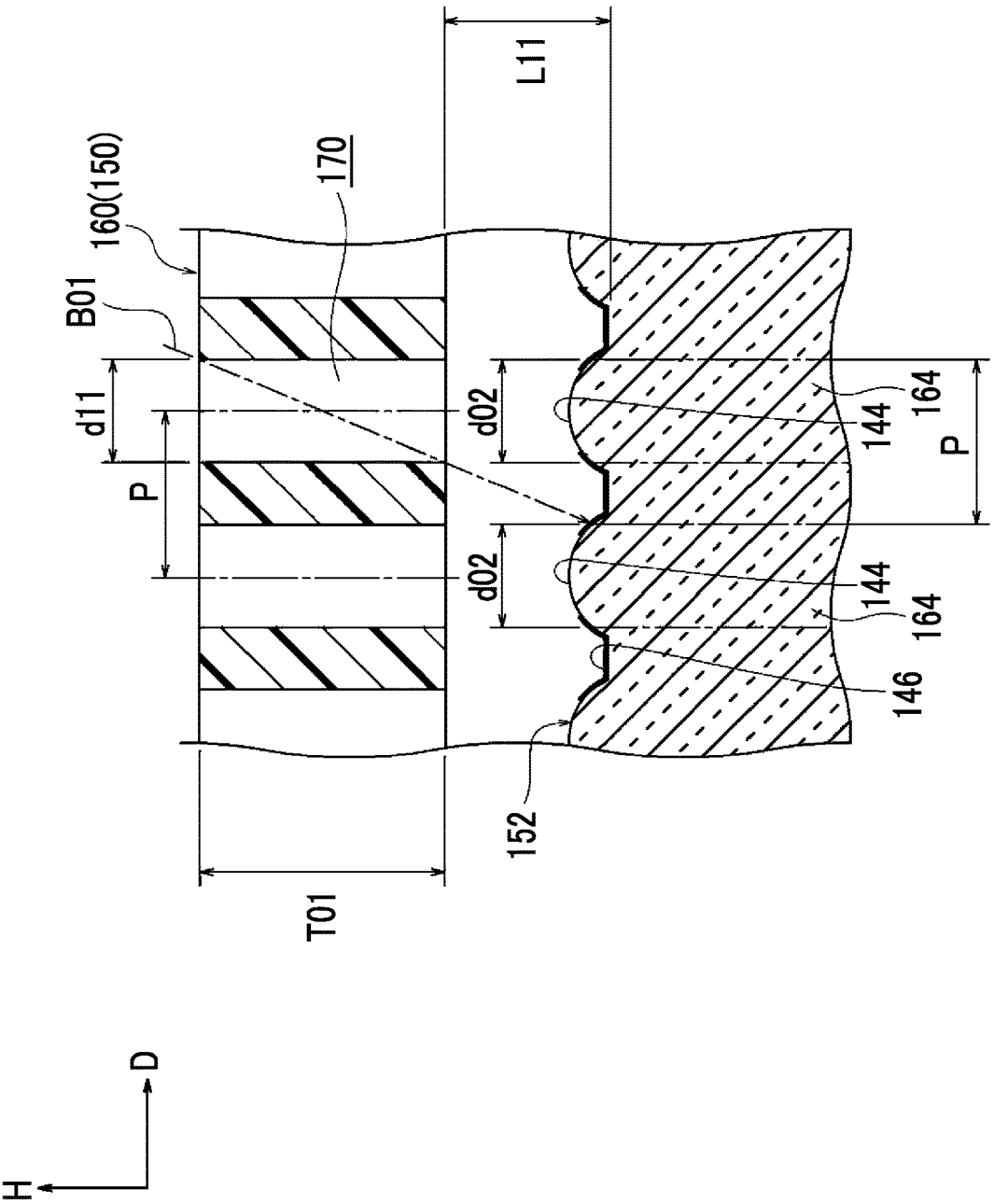
FIG. 24 is an enlarged cross-sectional view illustrating the lens array and the light-shielding member provided in the reading apparatus according to the exemplary embodiment of the invention.

Further, as illustrated in FIG. 24, assuming that the diameter of the through-hole 170 of the light-shielding portion 160 is d11, the interval (the pitch) of the through-hole 170 is P, a thickness of the light-shielding portion 160 is T01, and a distance between the planar surface portion of the upper surface 152a of the lens array 152 and the light-shielding portion 160 in the apparatus upward-downward direction (=the optical axis direction) is L11, the following equation (2) holds. In other words, assuming that a distance between the lens array 152 and the light-shielding member 150 in the apparatus upward-downward direction is L11, the following equation (2) holds.

$$0 < L11 \leq T01(P/d11 - 1) \qquad (2)$$

L11 is an example of L, 101 is an example of T, and d11 is an example of D.

As a result, among light passing through the through-hole 170, light B01 most inclined in the apparatus upward-downward direction is prevented from entering the thick lens 164 adjacent to the thick lens 164 facing the through-hole 170.

Method of Manufacturing Reading Apparatus 100

Next, a method of manufacturing the reading apparatus 100 will be described.

Figure 25:
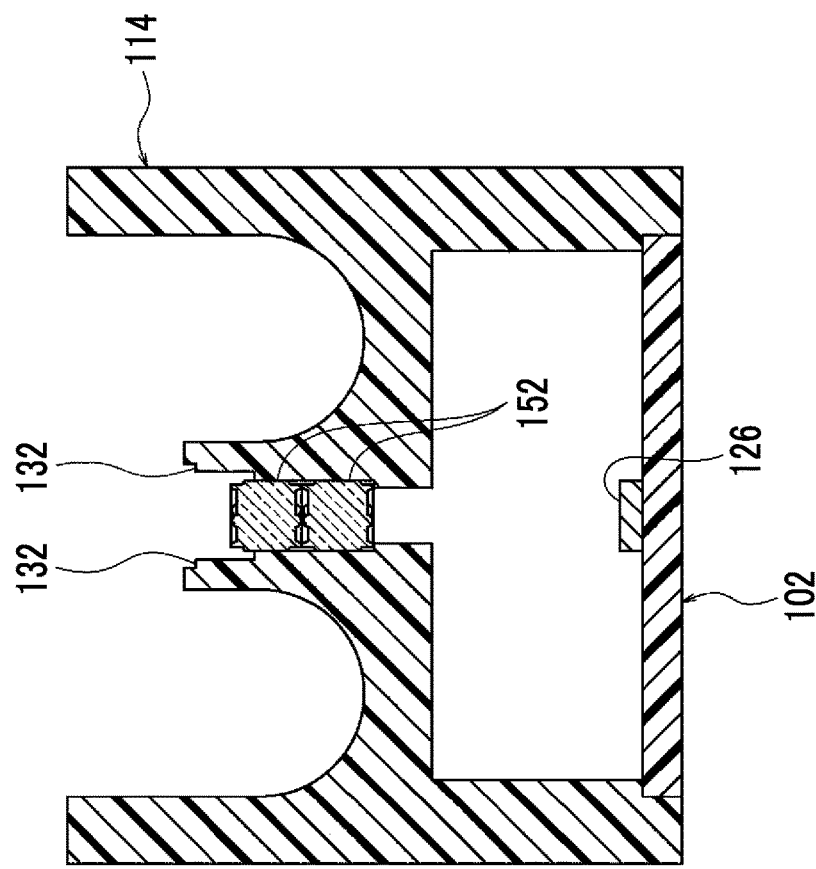
FIG. 25 is a cross-sectional view used to explain a method of manufacturing of the reading apparatus according to the exemplary embodiment of the invention.

First, as illustrated in FIG. 25, a housing 114 in which the light receiving substrate 102 having the plurality of light receiving elements 126 and the pair of lens arrays 152 having a plurality of thick lenses 164 through which light incident on the light receiving elements 126 passes are fixed is prepared.

Next, as illustrated in FIG. 26, the light-shielding portion 160 in which the through-hole 170 is formed is made to face the lens array 152 in the apparatus upward-downward direction. Specifically, the light-shielding portion 160 on the innermost side in the apparatus depth direction is grasped by a robot hand (not illustrated), placed on the upward surface 132, and made to face the lens array 152.

Figure 27:
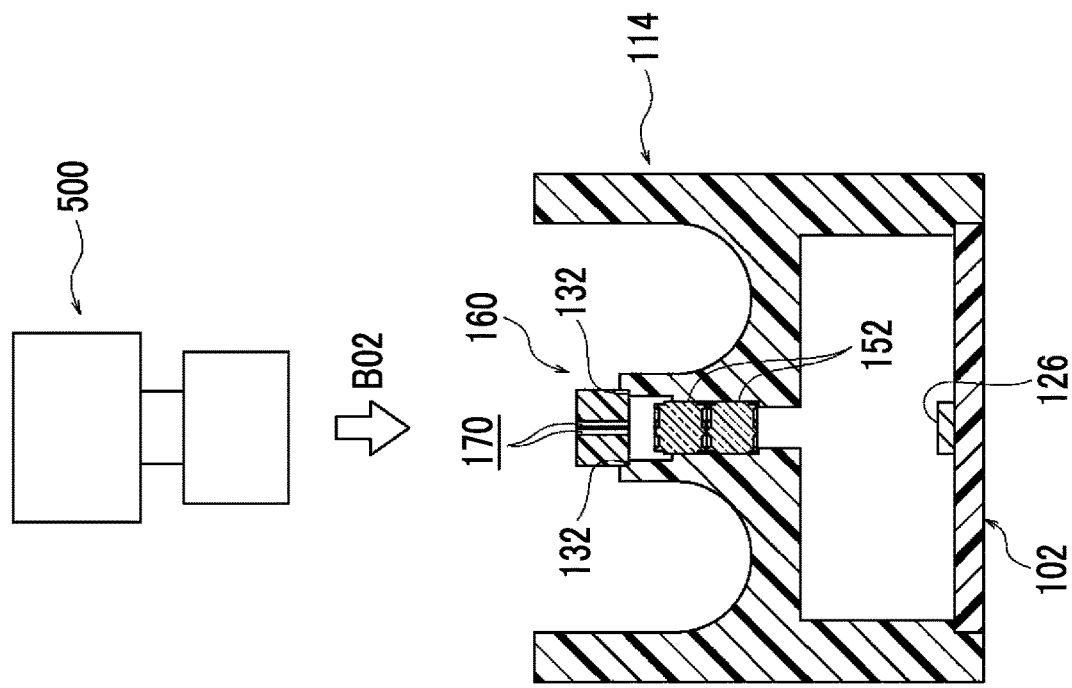
FIG. 27 is a cross-sectional view used to explain the method of manufacturing of the reading apparatus according to the exemplary embodiment of the invention.

Next, as illustrated in FIG. 27, the light-shielding portion 160 is irradiated with light B02 from above, the light B02 passes through the through-hole 170, and while the light receiving element 126 measures the amount of the light passing through the pair of lens arrays 152, the light-shielding portion 160 is moved to one or the other in the apparatus depth direction.

Specifically, the light B02 is emitted from the light irradiation apparatus 500. The light B02 passes through the through-hole 170, passes through the thick lens 164 (see FIG. 11) of the pair of lens arrays 152, and reaches the light receiving element 126. The light receiving element 126 photoelectrically converts the light B02 reaching the light receiving element 126. An electrical signal photoelectrically converted by the light receiving element 126 is transmitted to a light amount measuring apparatus (not illustrated) electrically connected to the light receiving element 126, and the light amount is measured by the light amount measuring apparatus.

While measuring the amount of light with the light receiving element 126, the light-shielding portion 160 is moved to one or the other in the apparatus depth direction, and an average value of the amount of light measured by all the light receiving elements 126 is set to be equal to or more than a predetermined reference value. In other words, the robot hand holding the light-shielding portion 160 is moved to one or the other in the apparatus depth direction so that the average value of the light amount measured by the light amount measuring apparatus becomes equal to or more than the predetermined reference value. In a state (=a time point) in which the average value of the amount of light is equal to or more than the reference value, the movement of the light-shielding portion 160 in the apparatus depth direction is stopped.

Next, the light-shielding portion 160 is irradiated with the light B02 from above, the light B02 passes through the through-hole 170, and while the light receiving element 126 measures the amount of the light passing through the pair of lens arrays 152, the light-shielding portion 160 is moved to one or the other in the apparatus width direction.

Specifically, the emission of the light B02 from the light irradiation apparatus 500 is continued without being stopped. The light B02 passes through the through-hole 170, passes through the thick lens 164 (see FIG. 11) of the pair of lens arrays 152, and reaches the light receiving element 126. The light receiving element 126 photoelectrically converts the light B02 reaching the light receiving element 126. An electrical signal photoelectrically converted by the light receiving element 126 is transmitted to the light amount measuring apparatus (not illustrated) described above electrically connected to the light receiving element 126, and the light amount is measured by the light amount measuring apparatus. While measuring the amount of light with the light receiving element 126, the light-shielding portion 160 is moved to one or the other in the apparatus width direction, and a difference between the maximum value and the minimum value of the amount of light measured by the light receiving element 126 is set to be equal to or less than a predetermined reference value. In other words, the robot hand holding the light-shielding portion 160 is moved to one or the other in the apparatus width direction so that the difference between the maximum value and the minimum value of the light amount measured by the light amount measuring apparatus is equal to or less than the predetermined reference value. In a state (=a time point) in which the difference between the maximum value and the minimum value of the amount of light is equal to or less than the reference value, the movement of the light-shielding portion 160 in the apparatus width direction is stopped.

Even in a case where the light-shielding portion 160 is moved to one or the other in the apparatus width direction after the average value of the amount of light is set to be equal to or more than the reference value, the state in which the average value of the amount of light measured by the light receiving element 126 is equal to or more than the reference value is maintained. This is because the average value of the amount of light greatly depends on a position of the light-shielding portion 160 in the apparatus depth direction.

Next, the light-shielding portion 160 is fixed to the housing 114 by using the fixing material 166 (for example, a UV curable adhesive (See FIG. 11)). In a case where the light-shielding portion 160 is fixed to the housing 114 by using the fixing material 166, the robot hand releases the holding on the light-shielding portion 160, and holds the next light-shielding portion 160 to be fixed to the housing 114.

By executing the steps described above one by one in order from the light-shielding portion 160 on the back side in the apparatus depth direction to the front side in the apparatus depth direction, the light-shielding member 150 configured with the plurality of light-shielding portions 160 is fixed to the housing 114.

Further, remaining members such as the pair of light guide bodies 110 are attached to the housing 114 to manufacture the reading apparatus according to the present exemplary embodiment.

Action of Central Portion Configuration

Next, an operation of the central portion configuration will be described, as compared with reading apparatuses 300 and 400 according to a comparative embodiment. First, configurations of the reading apparatus 300 and 400 according to the comparative embodiment will be generally described with respect to a portion different from the reading apparatus 100. Next, the difference in action between the different portion will be described.

Configuration of Reading Apparatus 300

Figure 28:
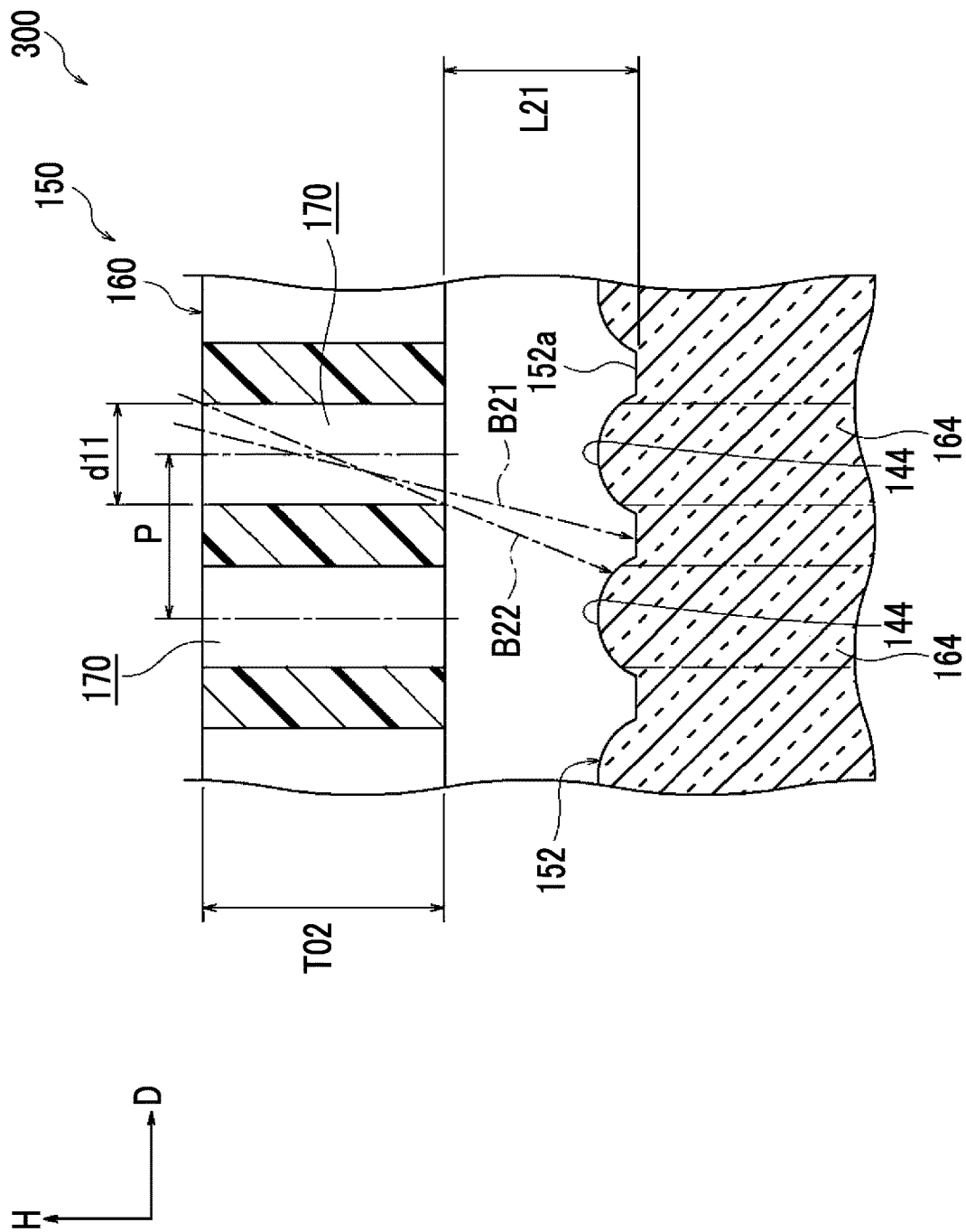
FIG. 28 is an enlarged cross-sectional view illustrating a lens array and a light-shielding member provided in a reading apparatus according to a comparative embodiment with respect to the exemplary embodiment of the invention.

As illustrated in FIG. 28, surface treatment such as a light-shielding film or the like is not applied to the lens array 152 of the reading apparatus 300 according to the comparative embodiment. Further, assuming that a distance between a planar surface portion of the lens array 152 and the light-shielding portion 160 in the apparatus upward-downward direction (=the optical axis direction) is L21, the following equation (3) holds. As described above, in the reading apparatus 300 according to the comparative embodiment, a distance between the lens array 152 and the light-shielding portion 160 is large.

$$L21 > T01(P/d11-1) \qquad (3)$$

Configuration of Reading Apparatus 400

As illustrated in FIG. 29, the surface treatment such as a light-shielding film or the like is not applied to the lens array 152 of the reading apparatus 400 according to the comparative embodiment. Further, the planar surface portion of the upper surface 152a of the lens array 152 in the apparatus upward-downward direction (=the optical axis direction) is in contact with the light-shielding portion 160.

Action of Reading Apparatuses 100, 300 and 400

Light (reflection light) reflected from the document G passes through the through-hole 170 formed in the light-shielding portion 160 illustrated in FIG. 11 and enters the thick lens 164 of one lens arrays 152. Further, the light incident on the thick lens 164 of the one lens array 152 is emitted from the thick lens 164 of the one lens array 152 and incident on the thick lens 164 of the other lens array 152. The light incident on the thick lens 164 of the other lens array 152 is emitted from the thick lens 164 of the other lens array 152 and collected (condensed) on the light receiving element 126 illustrated in FIG. 9.

Reading Apparatus 300

Here, as illustrated in FIG. 28, the surface treatment such as a light-shielding film or the like is not applied to the lens array 152 of the reading apparatus 300 according to the comparative embodiment. Further, the distance L21 between the lens array 152 and the light-shielding portion 160 satisfies the equation (3) described above.

Therefore, among light passing through the through-hole 170, light B21 inclined in the apparatus upward-downward direction is incident on the planar portion on the upper surface 152a. In addition, light B22 further inclined in the apparatus upward-downward direction is incident on the thick lens 164 adjacent to the thick lens 164 facing the through-hole 170.

Reading Apparatus 400

In addition, as illustrated in FIG. 29, the surface treatment such as a light-shielding film or the like is not applied to the lens array 152 of the reading apparatus 400 according to the comparative embodiment. Further, the lens array 152 and the light-shielding portion 160 are in contact with each other (not separated from each other).

Therefore, among light passing through the through-hole 170, the light B21 inclined in the apparatus upward-downward direction is reflected once on the inner surface of the through-hole 170 of the light-shielding portion 160 and is incident on the thick lens 164. Light inclined at a large angle (for example, 30 degrees, 45 degrees, or the like) based on the apparatus upward-downward direction also enters the through-hole 170 of the light-shielding portion 160 and is reflected on the inner surface of the through-hole 170.

Meanwhile, since the light entering the through-hole at such a large angle is repeatedly reflected on the inner surface of the through-hole 170 a plurality of times, the amount of light is attenuated repeatedly, so that even in a case where the light is incident on the thick lens 164, the amount of light is negligible. Meanwhile, since the light B21 is reflected only once below the inner surface of the through-hole 170, the amount of light is less attenuated by the reflection. Therefore, in a case where such light is incident on the thick lens 164, the light may cause stray light.

Reading Apparatus 100

On the other hand, in the lens array 152 of the reading apparatus 100 according to the present exemplary embodiment, as illustrated in FIGS. 15 and 24, the light-shielding film 146 is formed on the upper surface 152a of one lens array 152 disposed on the light-shielding member 150 side. Specifically, the light-shielding film 146 is formed on a planar portion on the upper surface 152a and an outer peripheral portion of the lens surface 144. Further, the distance L11 between the lens array 152 and the light-shielding portion 160 satisfies the equation (2) described above.

SUMMARY

As described above, in the reading apparatus 100, the light-shielding film 146 is formed on a planar portion on the upper surface 152a and an outer peripheral portion of the lens surface 144. Further, the distance L11 between the lens array 152 and the light-shielding member 150 satisfies the equation (2) described above. Therefore, as compared with the reading apparatus 300 according to the comparative embodiment, it is possible to prevent the light passing through the through-hole 170 from entering the portion other than the thick lens 164 around the thick lens 164 in the lens array 152.

In addition, the lens array 152 and the light-shielding member 150 are separated from each other in the apparatus upward-downward direction. Therefore, as compared with the reading apparatus 400 according to the comparative embodiment, the light reflected once below the through-hole 170 is suppressed from being incident on the thick lens 164. In addition, as compared with the case where the lens array 152 and the light-shielding member 150 are in contact with each other, it is possible to prevent the lens array from being in contact with the light-shielding member 150 and being damaged.

In addition, in the reading apparatus 100, the light incident on the portion other than the thick lens 164 around the thick lens 164 in the lens array 152 is suppressed, so that stray light is reduced as compared with the reading apparatus 300 according to the comparative embodiment. Therefore, deterioration of the quality of the read image is suppressed. Here, the "stray light" is scattered light which is generated in the vicinity of an optical path (in the vicinity of the optical axis of the thick lens 164) and affects performance of the reading apparatus, and is not required for reading an image.

In addition, in the reading apparatus 100, in the thick lens 164, the diameter d03 of the exposed portion not covered by the light-shielding film 146 is smaller than the diameter d11 of the through-hole 170 of the light-shielding portion 160. In other words, the diameter d03 of the exposed portion not covered by the light-shielding film 146 is smaller than the diameter d02 of the thick lens 164 as described in the equation (1). Therefore, even in a case where an axis of the through-hole 170 and the optical axis of the thick lens 164 are misaligned in a case where the light-shielding portion 160 is fixed to the housing 114, described in the "Method of Manufacturing Reading Apparatus 100", as compared to the case where a diameter of the exposed portion and the diameter d11 of the through-hole 170 are identical, the light passing through the through-hole 170 is suppressed from being incident on the thick lens 164 adjacent to the thick lens 164 facing the through-hole 170.

In addition, in the reading apparatus 100, the light-shielding film 146 in the same manner as the upper surface 152a of one lens array 152 is formed on the lower surface 152b of the other lens array 152. Therefore, as compared with the case where the light-shielding film is not formed on the lower surface 152b of the other lens array 152, the light inclined from the optical axis (=the apparatus upward-downward direction) is suppressed from being emitted from the lower surface 152b of the other lens array 152.

This point will be described in detail. Some of light passing through the through-hole 170 of the light-shielding portion 160 and being incident on the thick lens 164 of one lens array 152 are reflected by one or both of the lens surface 144 on the upper surface 152a and the protrusion surface 158 on the lower surface 152b in one lens array 152, and stray light is generated, in some cases. In the same manner, some of light being incident on the thick lens 164 of the other lens array 152 are reflected by one or both of the protrusion surface 158 on the upper surface 152a and the protrusion surface 158 on the lower surface 152b in the other lens array 152, and stray light is generated, in some cases. In the reading apparatus 100, the light-shielding film 146 in the same manner as the upper surface 152a of one lens array 152 is formed on the lower surface 152b of the other lens array 152. Therefore, it is possible to prevent the stray light from being emitted from the lower surface 152b of the other lens array 152 toward the light receiving element 126 of the light receiving substrate 102 through the lens array 152.

In addition, in the reading apparatus 100, one lens array 152 on the document G side and the other lens array 152 on the light receiving substrate 102 side are symmetrical in the apparatus upward-downward direction. Therefore, the top and bottom of one lens array 152 is reversed (=rotation by 180 degrees) and used for the other lens array 152, so that the identical components are used for one lens array 152 and the other lens array 152.

In addition, in the reading apparatus 100, the overhanging portion 162b of the light-shielding portion 160 covers the recess portion 140a formed on the sandwiching surface 140 of the housing 114 as viewed from above (=optical axis direction). Therefore, as viewed from above, light is suppressed from being incident on the lens array 152 through the recess portion 140a, as compared with the case where the overhanging portion 162b and the recess portion 140a are separated from each other.

In addition, in the reading apparatus 100, as viewed from above, the overhanging portion 162b of the light-shielding portion 160 covers the entire recess portion 140a formed on the sandwiching surface 140 of the housing 114. Therefore, as viewed from above, the light is suppressed from being incident on the lens array 152 through the recess portion 140a, as compared with the case where the overhanging portion 162b of the light-shielding portion 160 covers a part of the recess portion 140a (in a case where the overhanging portion 162b does not cover the recess portion 140a).

In addition, the image forming apparatus 10 includes the reading apparatus 100. Therefore, as compared with the case where the reading apparatus 300 or 400 according to the comparative embodiment is provided, deterioration of the reading image quality is suppressed, so that quality deterioration of an output image is suppressed.

Although the specific exemplary embodiments of the invention are described in detail, the exemplary embodiment of the invention is not limited to such embodiments, and it is apparent to those skilled in the art that various other exemplary embodiments can be taken within the scope of the present invention. For example, in the exemplary embodiment described above, the diameter d03 of the exposed portion not covered by the light-shielding film 146 is smaller than the diameter d11 of the through-hole 170 of the light-shielding portion 160. Meanwhile, the diameter of the exposed portion may be identical with the diameter of the through-hole. Meanwhile, in this case, the effect of the diameter d03 of the exposed portion is smaller than the diameter d11 of the through-hole 170 does not work.

In addition, in the exemplary embodiment described above, the light-shielding film 146 in the same manner as the upper surface 152a of one lens array 152 is formed on the lower surface 152b of the other lens array 152, but the light-shielding film may not be formed on the lower surface 152b of the other lens array 152. Meanwhile, in this case, the action that the light-shielding film is formed on the lower surface 152b of the other lens array 152 does not work.

In addition, in the exemplary embodiment described above, the one lens array 152 and the other lens array 152 are symmetrical in the apparatus upward-downward direction, but may not be symmetrical. Meanwhile, in this case, the effect of being symmetrical does not work.

In addition, in the exemplary embodiment described above, as viewed from above, the overhanging portion 162b of the light-shielding portion 160 covers the recess portion 140a formed on the sandwiching surface 140 of the housing 114, but may not cover the recess portion 140a. Meanwhile, in this case, the effect that the overhanging portion 162b covers the recess portion 140a does not work.

In addition, in the exemplary embodiment described above, the light-shielding member 150 is formed with the plurality of light-shielding portions 160, but the light-shielding member 150 may be integrally formed.

In addition, in the exemplary embodiment described above, the reading apparatus includes the pair of lens arrays 152, but the reading apparatus may have one lens array.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A reading apparatus comprising:
    a light-shielding member having a thickness T in which a plurality of through-holes having a diameter D through which light reflected from a document passes are formed at an interval P;
    an optical member that includes a surface separated from and facing the light-shielding member and including lenses formed at positions facing the through-holes, in which a light-shielding film is formed on at least the surface other than a lens surface of the lens, and a distance L from the light-shielding member in an optical axis direction of the lens satisfies $0 < L \leq T\,(P/D - 1)$; and
    a substrate that includes an element that receives light passing through the optical member.

2. The reading apparatus according to claim 1, wherein a diameter of an exposed portion, at which the light-shielding film is not formed, on the lens surface of the lens is smaller than a diameter of the through-hole.

3. The reading apparatus according to claim 2, wherein two optical members are provided,
    from the document side, the light-shielding member, one optical member, the other optical member, and the substrate are arranged in this order in the optical axis direction, and
    a plurality of other lenses corresponding to the lenses are formed on another surface of the other optical member facing a side opposite to the surface of the one optical member, and a light-shielding film is formed on at least the other surface other than a lens surface of the other lens.

4. The reading apparatus according to claim 3, wherein the optical members and the other optical member are symmetrical in the optical axis direction.

5. The reading apparatus according to claim 4, further comprising:
    a housing to which the optical member is attached,
    wherein the light-shielding member includes a base portion extending in one direction and overhanging portions overhang from both sides of the base portion in a width direction intersecting the one direction,
    the optical member includes a side surface extending in the one direction and facing the width direction, and a protrusion portion is provided on the side surface,
    a pair of sandwiching surfaces which sandwich the optical member from the width direction are formed in the housing, and a recess portion which allows the protrusion portion to escape is formed on the sandwiching surface, and
    the overhanging portion covers at least a part of the recess portion, as viewed from the optical axis direction.

6. The reading apparatus according to claim 5, wherein the overhanging portion covers the entire recess portion, as viewed from the optical axis direction.

7. The reading apparatus according to claim 3, further comprising:
    a housing to which the optical member is attached,
    wherein the light-shielding member includes a base portion extending in one direction and overhanging portions overhang from both sides of the base portion in a width direction intersecting the one direction,
    the optical member includes a side surface extending in the one direction and facing the width direction, and a protrusion portion is provided on the side surface,
    a pair of sandwiching surfaces which sandwich the optical member from the width direction are formed in the housing, and a recess portion which allows the protrusion portion to escape is formed on the sandwiching surface, and
    the overhanging portion covers at least a part of the recess portion, as viewed from the optical axis direction.

8. The reading apparatus according to claim 7, wherein the overhanging portion covers the entire recess portion, as viewed from the optical axis direction.

9. The reading apparatus according to claim 2, further comprising:
- a housing to which the optical member is attached,
- wherein the light-shielding member includes a base portion extending in one direction and overhanging portions overhang from both sides of the base portion in a width direction intersecting the one direction,
- the optical member includes a side surface extending in the one direction and facing the width direction, and a protrusion portion is provided on the side surface,
- a pair of sandwiching surfaces which sandwich the optical member from the width direction are formed in the housing, and a recess portion which allows the protrusion portion to escape is formed on the sandwiching surface, and
- the overhanging portion covers at least a part of the recess portion, as viewed from the optical axis direction.

10. The reading apparatus according to claim 9,
- wherein the overhanging portion covers the entire recess portion, as viewed from the optical axis direction.

11. The reading apparatus according to claim 1, further comprising:
- a housing to which the optical member is attached,
- wherein the light-shielding member includes a base portion extending in one direction and overhanging portions overhang from both sides of the base portion in a width direction intersecting the one direction,
- the optical member includes a side surface extending in the one direction and facing the width direction, and a protrusion portion is provided on the side surface,
- a pair of sandwiching surfaces which sandwich the optical member from the width direction are formed in the housing, and a recess portion which allows the protrusion portion to escape is formed on the sandwiching surface, and
- the overhanging portion covers at least a part of the recess portion, as viewed from the optical axis direction.

12. The reading apparatus according to claim 11,
- wherein the overhanging portion covers the entire recess portion, as viewed from the optical axis direction.

\* \* \* \* \*